United States Patent
Chicoine et al.

(10) Patent No.: US 10,972,867 B2
(45) Date of Patent: *Apr. 6, 2021

(54) LOCATION BASED DISCOVERY OF REAL-TIME MERCHANT DEVICE ACTIVITY

(71) Applicant: Groupon, Inc., Chicago, IL (US)

(72) Inventors: Leslie Jean Chicoine, San Francisco, CA (US); Anindha Parthy, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,401

(22) Filed: Aug. 11, 2020

(65) Prior Publication Data

US 2021/0029494 A1   Jan. 28, 2021

Related U.S. Application Data

(63) Continuation of application No. 16/710,019, filed on Dec. 11, 2019, now Pat. No. 10,779,119, which is a
(Continued)

(51) Int. Cl.
*H04W 24/00* (2009.01)
*H04W 4/02* (2018.01)
(Continued)

(52) U.S. Cl.
CPC ........ *H04W 4/023* (2013.01); *G06Q 30/0201* (2013.01); *G06Q 30/0601* (2013.01)

(58) Field of Classification Search
CPC .............. H04W 4/023; H04W 68/005; G06Q 30/0201; G06Q 30/0601; G06Q 20/3224;
(Continued)

(56) References Cited

U.S. PATENT DOCUMENTS 8,255,268 B2   8/2012   Rane et al.
8,571,919 B2   10/2013  Rane et al.
(Continued)

FOREIGN PATENT DOCUMENTS

CN   101635042 A   *  1/2010   ............. G06Q 30/06
CN   101635042 A      1/2010
(Continued)

OTHER PUBLICATIONS

U.S. Appl. No. filed Apr. 9, 2014; In re: Krishna et al., entitled Communication Beacon Based Promotions.for Mobile Devices, U.S. Appl. No. 14/248,676.

*Primary Examiner* — Mahendra R Patel
(74) *Attorney, Agent, or Firm* — Alston & Bird LLP

(57) ABSTRACT

Systems, apparatus, methods, and non-transitory media for consumer interfaces including ambient map displays are discussed herein. Some embodiments may include a system with one or more servers. The one or more servers may be configured to generate a consumer interface including an ambient map display with a graphical representation of a map. The ambient map display may further include merchant location indicators within the map. The merchant location indicators may indicate the activity level for merchant locations that are determined to be near a consumer device, such as through a variable blink rate or other indicator. The activity level may represent, for example, the number of consumers at a particular venue or the rate of a particular consumer activity, such as transaction activity. The system may be configured to provide real-time merchant data to consumer device based on tracking the consumer device location.

20 Claims, 10 Drawing Sheets

Related U.S. Application Data continuation of application No. 16/374,099, filed on Apr. 3, 2019, now Pat. No. 10,542,376, which is a continuation of application No. 16/111,743, filed on Aug. 24, 2018, now Pat. No. 10,292,010, which is a continuation of application No. 15/816,536, filed on Nov. 17, 2017, now Pat. No. 10,091,617, which is a continuation of application No. 15/613,918, filed on Jun. 5, 2017, now Pat. No. 9,848,300, which is a continuation of application No. 14/980,667, filed on Dec. 28, 2015, now Pat. No. 9,699,610.

(60) Provisional application No. 62/097,023, filed on Dec. 26, 2014.

(51) Int. Cl.
*G06Q 30/06* (2012.01)
*G06Q 30/02* (2012.01)

(58) Field of Classification Search
CPC .......... G06Q 30/02; G06Q 30/00; G01S 5/02; G01S 5/0252; H04L 67/12; H04L 67/396; H04N 5/23293; H03W 4/023
USPC ....................................... 455/456.3
See application file for complete search history.

(56) References Cited

U.S. PATENT DOCUMENTS

| | | | |
|---|---|---|---|
| 8,812,024 B2 | 8/2014 | Obermeyer et al. | |
| 9,195,290 B2 * | 11/2015 | Siliski | H04M 1/04 |
| 9,576,286 B1 | 2/2017 | Artman et al. | |
| 9,699,610 B1 | 7/2017 | Chicoine et al. | |
| 9,990,646 B2 * | 6/2018 | Salmon | G06Q 20/387 |
| 10,007,915 B2 * | 6/2018 | Singh | G06Q 30/02 |
| 10,489,754 B2 * | 11/2019 | Fineman | G06Q 20/40 |
| 10,672,018 B2 * | 6/2020 | Carlson | G06Q 30/0224 |
| 2003/0220835 A1 * | 11/2003 | Barnes, Jr. | H04W 4/02 705/14.36 |
| 2004/0243307 A1 | 12/2004 | Geelen | |
| 2005/0251440 A1 | 11/2005 | Bednarek | |
| 2007/0262861 A1 | 11/2007 | Anderson et al. | |
| 2008/0004888 A1 * | 1/2008 | Davis | G06Q 30/02 705/26.1 |
| 2008/0262925 A1 * | 10/2008 | Kim | G06Q 30/02 705/14.27 |
| 2010/0004853 A1 | 1/2010 | Siereveld et al. | |
| 2010/0030651 A1 | 2/2010 | Matotek et al. | |
| 2011/0071757 A1 | 3/2011 | Lee et al. | |
| 2011/0106597 A1 | 5/2011 | Ferdman et al. | |
| 2011/0178848 A1 | 7/2011 | Rane et al. | |
| 2011/0238476 A1 * | 9/2011 | Carr | H04W 4/21 705/14.25 |
| 2011/0243553 A1 | 10/2011 | Russell | |
| 2011/0264502 A1 * | 10/2011 | Taylor | G06Q 30/02 705/14.25 |
| 2011/0307382 A1 * | 12/2011 | Siegel | G06Q 20/4016 705/44 |
| 2012/0078751 A1 | 3/2012 | MacPhail et al. | |
| 2012/0094639 A1 * | 4/2012 | Carlson | G06Q 20/401 455/414.1 |
| 2012/0190386 A1 * | 7/2012 | Anderson | G01S 19/14 455/456.3 |
| 2012/0245995 A1 | 9/2012 | Chawla | |
| 2013/0080289 A1 * | 3/2013 | Roy | G06Q 20/204 705/26.8 |
| 2013/0124413 A1 * | 5/2013 | Itwaru | G06Q 20/20 705/44 |
| 2013/0203444 A1 | 8/2013 | Perry et al. | |
| 2013/0246176 A1 * | 9/2013 | Chang | G06Q 30/0255 705/14.53 |
| 2013/0246300 A1 * | 9/2013 | Fischer | G06Q 30/0251 705/347 |
| 2013/0278631 A1 * | 10/2013 | Border | G02C 5/143 345/633 |
| 2013/0290106 A1 * | 10/2013 | Bradley | G06Q 90/20 705/14.64 |
| 2014/0006129 A1 * | 1/2014 | Heath | G06Q 30/0222 705/14.23 |
| 2014/0078183 A1 * | 3/2014 | Watson | G06T 3/40 345/667 |
| 2014/0082505 A1 * | 3/2014 | Watson | G06F 3/0484 715/738 |
| 2014/0108108 A1 * | 4/2014 | Artman | G06Q 20/32 705/14.1 |
| 2014/0108247 A1 | 4/2014 | Artman et al. | |
| 2014/0180792 A1 * | 6/2014 | Zaheer | G06Q 30/0244 705/14.43 |
| 2014/0207680 A1 | 7/2014 | Rephlo | |
| 2014/0214508 A1 | 7/2014 | Lee | |
| 2014/0222599 A1 * | 8/2014 | Wang | G06Q 20/027 705/21 |
| 2014/0229375 A1 | 8/2014 | Zaytzsev et al. | |
| 2014/0249747 A1 | 9/2014 | Kosseifi et al. | |
| 2014/0337123 A1 * | 11/2014 | Nuernberg | H04W 4/021 705/14.45 |
| 2014/0365304 A1 * | 12/2014 | Showers | G01S 5/0252 705/14.55 |
| 2015/0035685 A1 | 2/2015 | Strickland et al. | |
| 2015/0046276 A1 | 2/2015 | Artman et al. | |
| 2015/0091740 A1 | 4/2015 | Bai et al. | |
| 2015/0100907 A1 | 4/2015 | Erenrich et al. | |
| 2015/0206175 A1 * | 7/2015 | Carriere | G06Q 30/0269 705/14.42 |
| 2015/0339689 A1 * | 11/2015 | Chen | G06Q 30/0282 705/7.34 |
| 2016/0169696 A1 | 6/2016 | Butts et al. | |
| 2016/0370200 A1 | 12/2016 | Lebeau et al. | |

FOREIGN PATENT DOCUMENTS

| | | | | |
|---|---|---|---|---|
| EP | | 2113895 A1 * | 11/2009 | ........... G06Q 20/322 |
| EP | | 2113895 A1 | 11/2009 | |
| KR | 20120094639 A | * | 8/2012 | |

* cited by examiner

LOCATION BASED DISCOVERY OF REAL-TIME MERCHANT DEVICE ACTIVITY

CROSS-REFERENCE TO RELATED APPLICATIONS

This application is a continuation of U.S. application Ser. No. 16/710,019, filed Dec. 11, 2019, titled "Location Based Discovery of Real-Time Merchant Device Activity," which is a continuation of U.S. application Ser. No. 16/374,099, filed Apr. 3, 2019, titled "Location Based Discovery of Real-time Merchant Device Activity," the contents of which is incorporated by reference herein in its entirety, which is a continuation of U.S. application Ser. No. 16/111,743, titled "Location Based Discovery of Real-time Merchant Device Activity," filed Aug. 24, 2018, now U.S. Pat. No. 10,292,010, issued May 14, 2019, the contents of each of which is incorporated by reference herein in its entirety, which is a continuation of U.S. application Ser. No. 15/816,536, titled "Location Based Discovery of Real-time Merchant Device Activity," filed Nov. 17, 2017, now U.S. Pat. No. 10,091,617, issued Oct. 2, 2018, which is a continuation of U.S. application Ser. No. 15/613,918, titled "Location Based Discovery of Real-time Merchant Device Activity," filed Jun. 5, 2017, now U.S. Pat. No. 9,848,300, issued Dec. 19, 2017, which is incorporated by reference herein in its entirety, which was a continuation of U.S. application Ser. No. 14/980,667, titled "Location Based Discovery of Real-time Merchant Device Activity," filed Dec. 28, 2015, now U.S. Pat. No. 9,699,610, issued Jul. 4, 2017, which is incorporated by reference herein in its entirety, and which claims the benefit of U.S. Provisional Application No. 62/097,023, titled "Location Based Discovery of Real-time Merchant Device Activity," filed Dec. 26, 2014, which is also incorporated by reference herein in its entirety.

FIELD

Embodiments of the invention relate, generally, to techniques for sharing real-time electronic data associated with merchant locations with networked consumer devices and based on consumer device location.

BACKGROUND

Financial transactions between merchants and consumers typically require the consumers to present a form of payment to the merchant. As a result, consumers may be required to keep wallets that include payment instruments such as cash, credit cards, debit cards, deal vouchers, coupons, reward tracking cards, checks or the like that may be accepted by merchants and/or devices used at the point-of-sale locations (e.g., point-of-sale devices, such as cash registers, credit card readers, etc.). Various merchants have begun to adopt point-of-sale merchant devices capable of communicating with mobile consumer devices (e.g., smart phones) to help streamline electronic payments because of the widespread adoption of such mobile consumer devices. Through applied effort, ingenuity, and innovation, solutions to improve such systems have been identified and are described in detail below.

BRIEF SUMMARY

Some embodiments may provide for a system configured to provide improved consumer interfaces to consumer devices that are responsive to changing consumer device location. For example, the system may include one or more servers with communication circuitry configured to connect with consumer devices and merchant devices via a network. The one or more servers may further include processing circuitry configured to: receive, via the network, transaction data from the merchant devices; determine an activity level score for each of the plurality of merchant locations based on the transaction data; receive, via the network and from a consumer device, consumer device location data indicating a consumer device location of the consumer device; determine, based on a comparison of the consumer device location and the plurality of merchant locations, one or more local merchant locations to the consumer device location; generate a consumer interface including an ambient map display, wherein the ambient map display includes a graphical representation of a map with the one or more local merchant location indicators within the map that indicate the activity level score for the one or more local merchant locations; and provide the consumer interface to the consumer device via the network.

In some embodiments, the processing circuitry configured to determine the one or more local merchant locations proximate to the plurality of merchant locations may include processing circuitry being configured to: determine a distance threshold; and determine the one or more local merchant locations from the plurality of merchant locations based on determining that the one or more local merchant locations are within the distance threshold to the consumer device location.

In some embodiments, the processing circuitry configured to determine the distance threshold may include the processing circuitry being configured to: determine, based on the consumer device location data a travel speed of the consumer device; and determine the distance threshold based on the travel speed of the consumer device.

In some embodiments, the processing circuitry configured to determine the distance threshold may include the processing circuitry being configured to: receive, via the network and from the consumer device, consumer device input indicating a mode of transportation; and determine the distance threshold based on the mode of transportation.

In some embodiments, the processing circuitry configured to determine the distance threshold may include the processing circuitry being configured to: determine, based on the consumer device location data, a mode of transportation; and determine the distance threshold based on the mode of transportation.

In some embodiments, the processing circuitry configured to determine the activity level score for each of the plurality of merchant locations based on the transaction data may include the processing circuitry being configured to determine, based on the transaction data, an average rate of received transaction data instances for a predetermined period of time.

In some embodiments, the processing circuitry configured to determine the activity level score for each of the plurality of merchant locations based on the transaction data may include the processing circuitry being configured to determine, based on the transaction data, a projected activity level.

In some embodiments, the processing circuitry configured to determine the activity level score for each of the plurality of merchant locations based on the transaction data may include the processing circuitry being configured to determine, based on the transaction data, a current activity level.

In some embodiments, the transaction data from the merchant devices may indicate consumer device interactions with merchant devices via wireless direct connections. The processing circuitry configured to determine the activity level score for each of the plurality of merchant locations based on the transaction data may include the processing circuitry being configured to determine the activity level score based on the consumer device interactions associated with each of the plurality of merchant locations.

In some embodiments, the transaction data may include an indication of a completed transaction. The processing circuitry may be further configured to, for each completed transaction of a local merchant location, provide an indication of the completed transaction as a visual enhancement to a local merchant indicator associated with the local merchant location.

In some embodiments, at least one of the one or more local merchant location indicators may be visually enhanced with blink rates that are variable based on the activity level scores.

In some embodiments, the processing circuitry may be further configured to, in response to receiving consumer device input indicating a selection of a local merchant location indicator, provide a merchant display to the consumer interface including merchant data of a local merchant location associated with the local merchant location indicator.

In some embodiments, the processing circuitry may be further configured to display, within the consumer interface, a travel path extending from the consumer device location to a local merchant location associated with a local merchant location indicator.

Some embodiments may provide for a machine-implemented method, including: receiving, by processing circuitry of one or more servers connected with merchant devices and consumer devices via a network, transaction data from the merchant devices; determining, by the processing circuitry, an activity level score for each of the plurality of merchant locations based on the transaction data; receiving, by the processing circuitry via the network and from a consumer device, consumer device location data indicating a consumer device location of the consumer device; determining, by the processing circuitry and at least in part by comparing the consumer device location and the plurality of merchant locations, one or more local merchant locations proximate to the consumer device location; generating, by the processing circuitry a consumer interface including an ambient map display, wherein the ambient map display comprises one or more local merchant location indicators associated with the one or more local merchant locations, and wherein at least one of the one or more local merchant location indicators is visually enhanced based on the activity level score for the one or more local merchant locations; and providing, by the processing circuitry, the consumer interface to the consumer device via the network.

In some embodiments, determining the one or more local merchant locations proximate to the plurality of merchant locations may include: determining a distance threshold; and determining the one or more local merchant locations from the plurality of merchant locations based on determining that the one or more local merchant locations are within the distance threshold to the consumer device location.

In some embodiments, determining the distance threshold may include, by the processing circuitry: determining, based on the consumer device location data a travel speed of the consumer device; and determining the distance threshold based on the travel speed of the consumer device.

In some embodiments, determining the distance threshold may include, by the processing circuitry: receiving, via the network and from the consumer device, consumer device input indicating a mode of transportation; and determining the distance threshold based on the mode of transportation.

In some embodiments, determining the distance threshold may include, by the processing circuitry: determining, based on the consumer device location data, a mode of transportation; and determining the distance threshold based on the mode of transportation.

In some embodiments, determining the activity level score for each of the plurality of merchant locations based on the transaction data may include determining, based on the transaction data, an average rate of received transaction data instances for a predetermined period of time.

In some embodiments, determining the activity level score for each of the plurality of merchant locations based on the transaction data may include determining, based on the transaction data, a projected activity level.

In some embodiments, the transaction data from the merchant devices may indicate consumer device interactions with merchant devices via wireless direct connections. Determining the activity level score for each of the plurality of merchant locations based on the transaction data may include determining the activity level score based on the consumer device interactions associated with each of the plurality of merchant locations.

In some embodiments, the transaction data may include an indication of a completed transaction. The method may further include, by the processing circuitry and for each completed transaction of a local merchant location, providing an indication of the completed transaction as a visual enhancement to a local merchant indicator associated with the local merchant location.

In some embodiments, the at least one of the one or more local merchant location indicators may be visually enhanced with blink rates that are variable based on the activity level scores.

In some embodiments, the method may further include, by the processing circuitry and in response to receiving consumer device input indicating a selection of a local merchant location indicator, providing a merchant display to the consumer interface including merchant data of a local merchant location associated with the local merchant location indicator.

In some embodiments, the method may further include, by the processing circuitry, displaying within the consumer interface a travel path extending from the consumer device location to a local merchant location associated with a local merchant location indicator.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
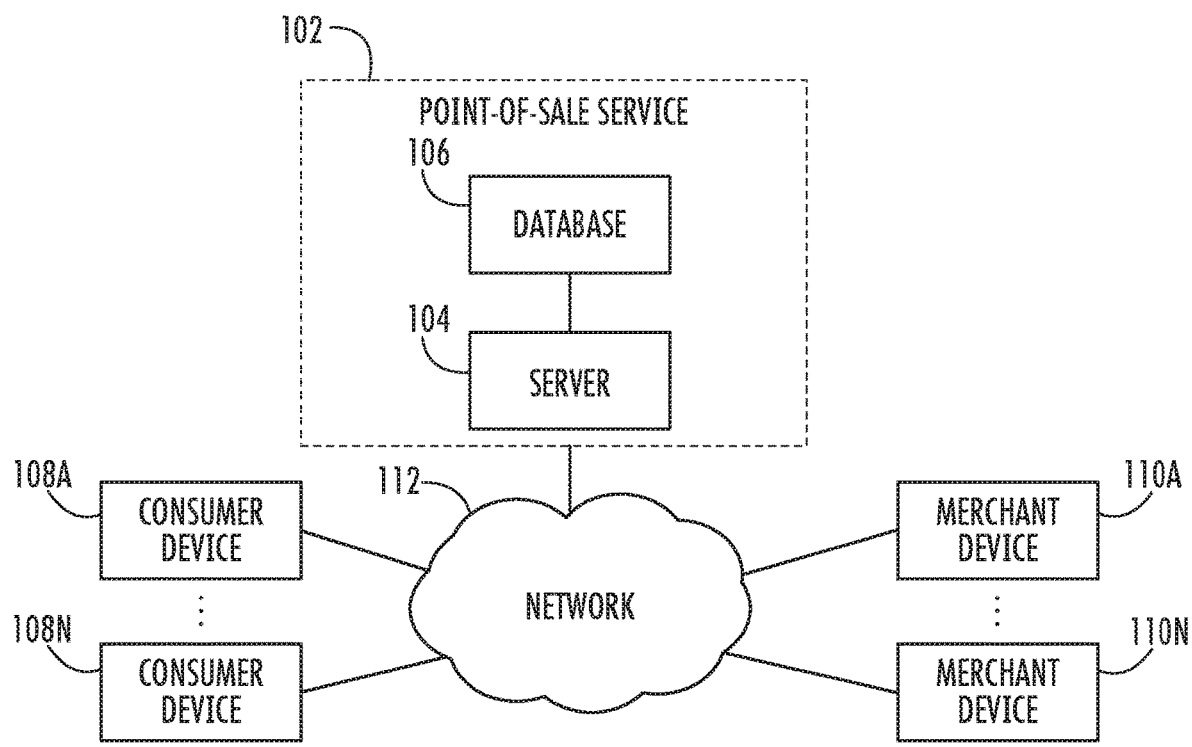
Figure 2:
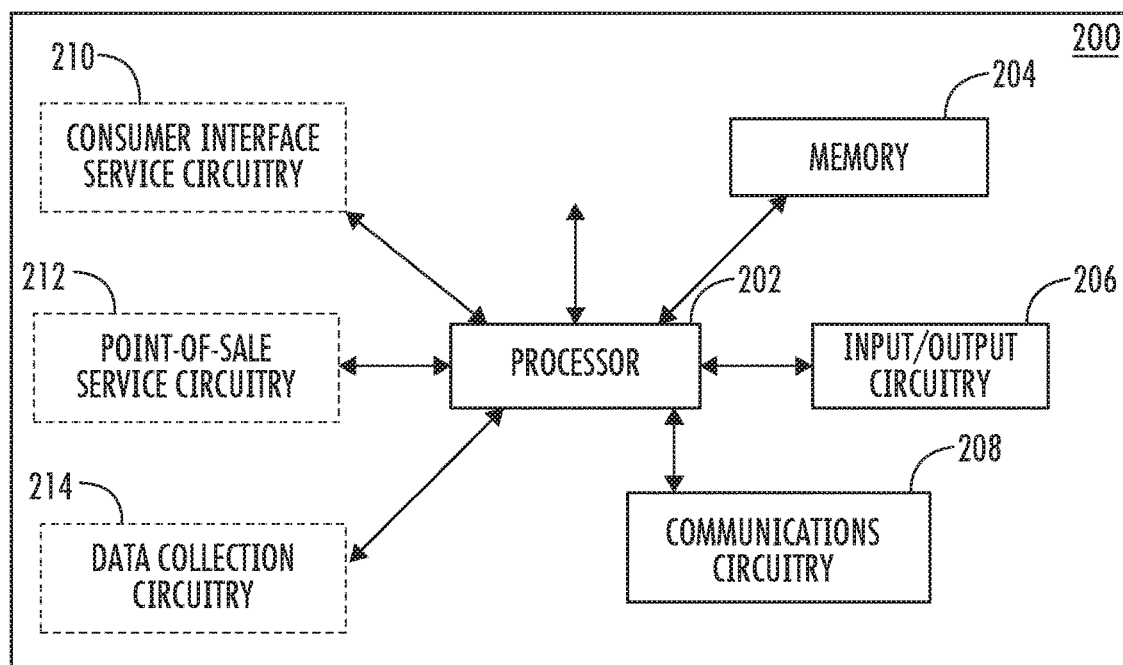
Figure 3:
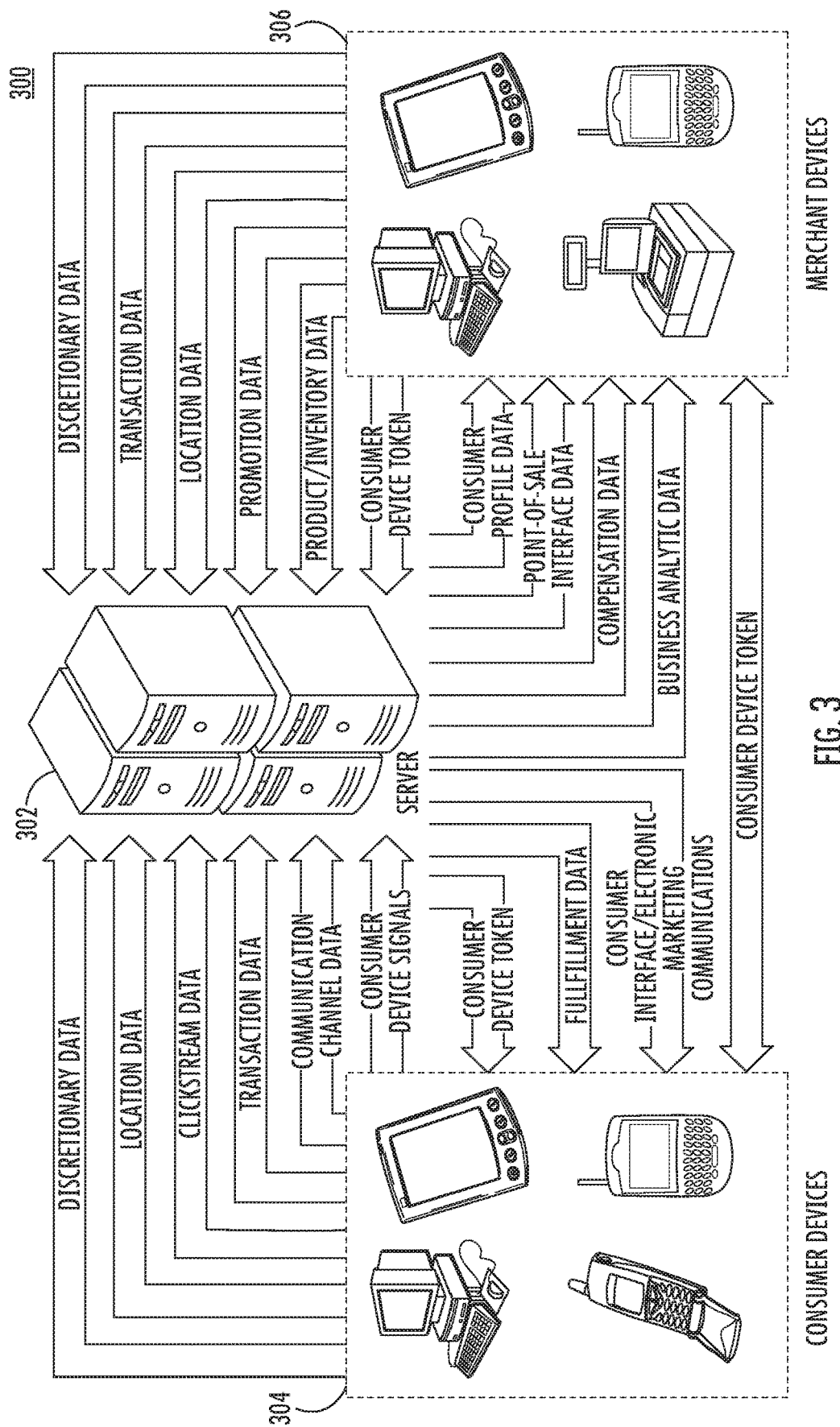
Figure 4:
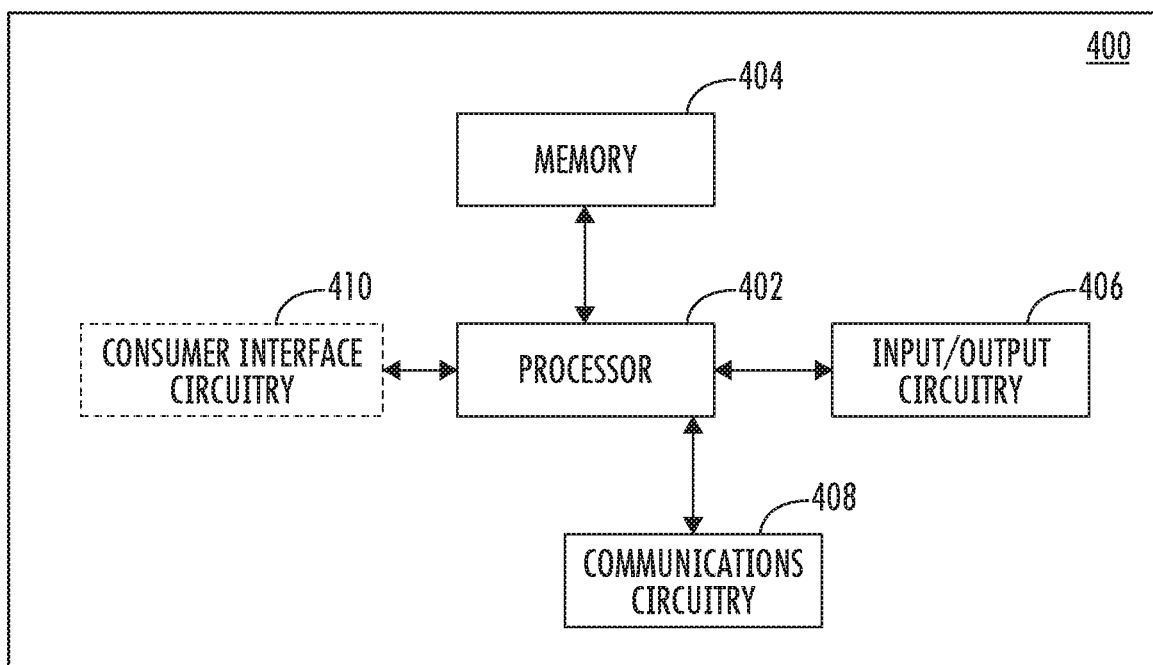
Figure 5:
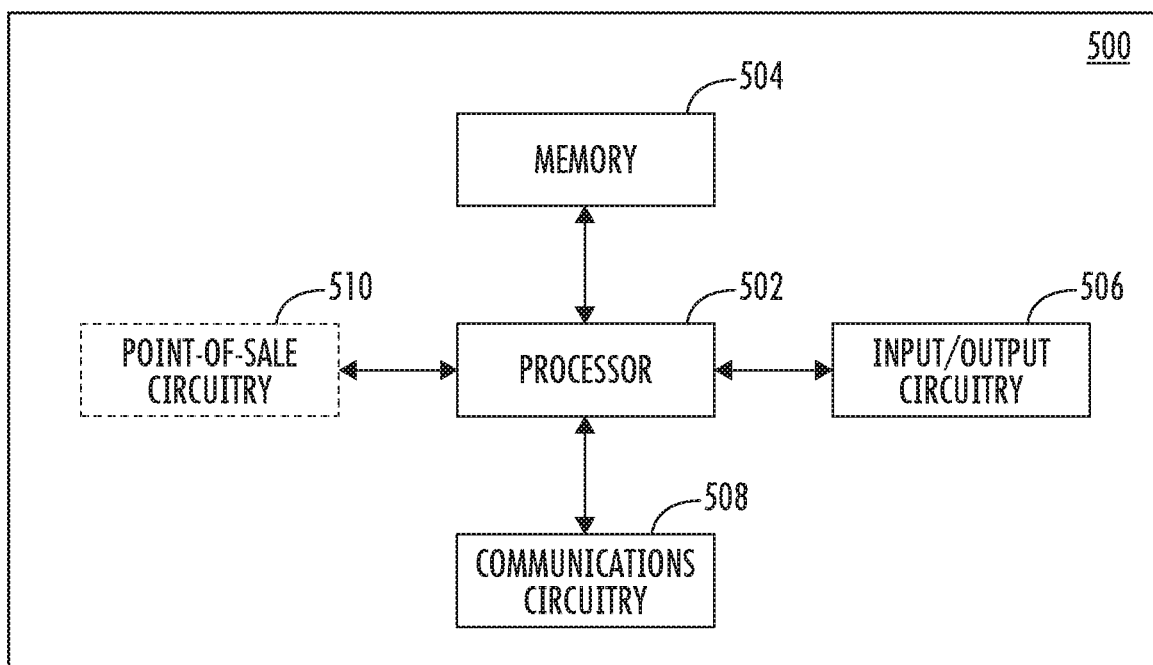
Figure 6:
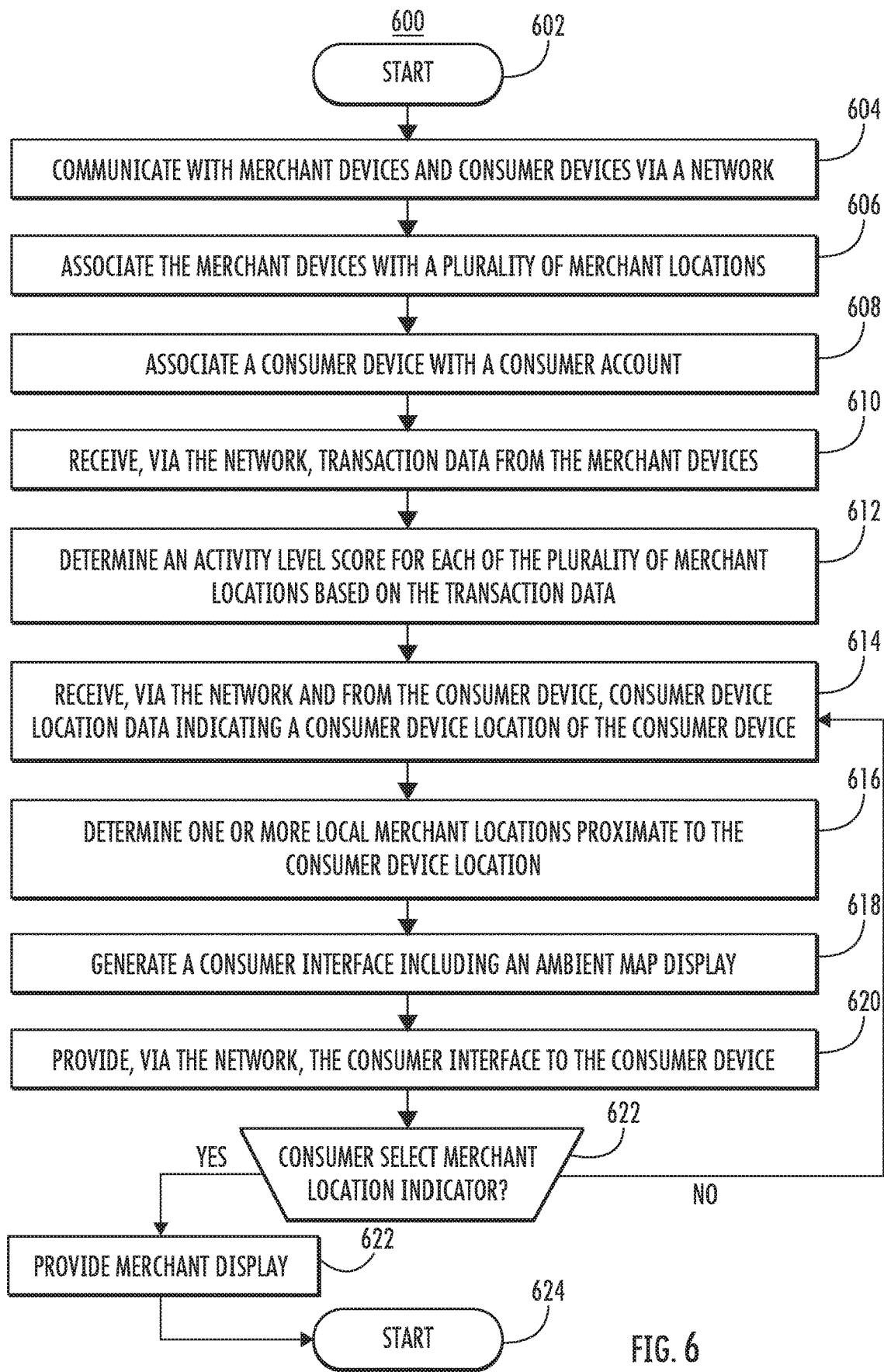
Figure 7:
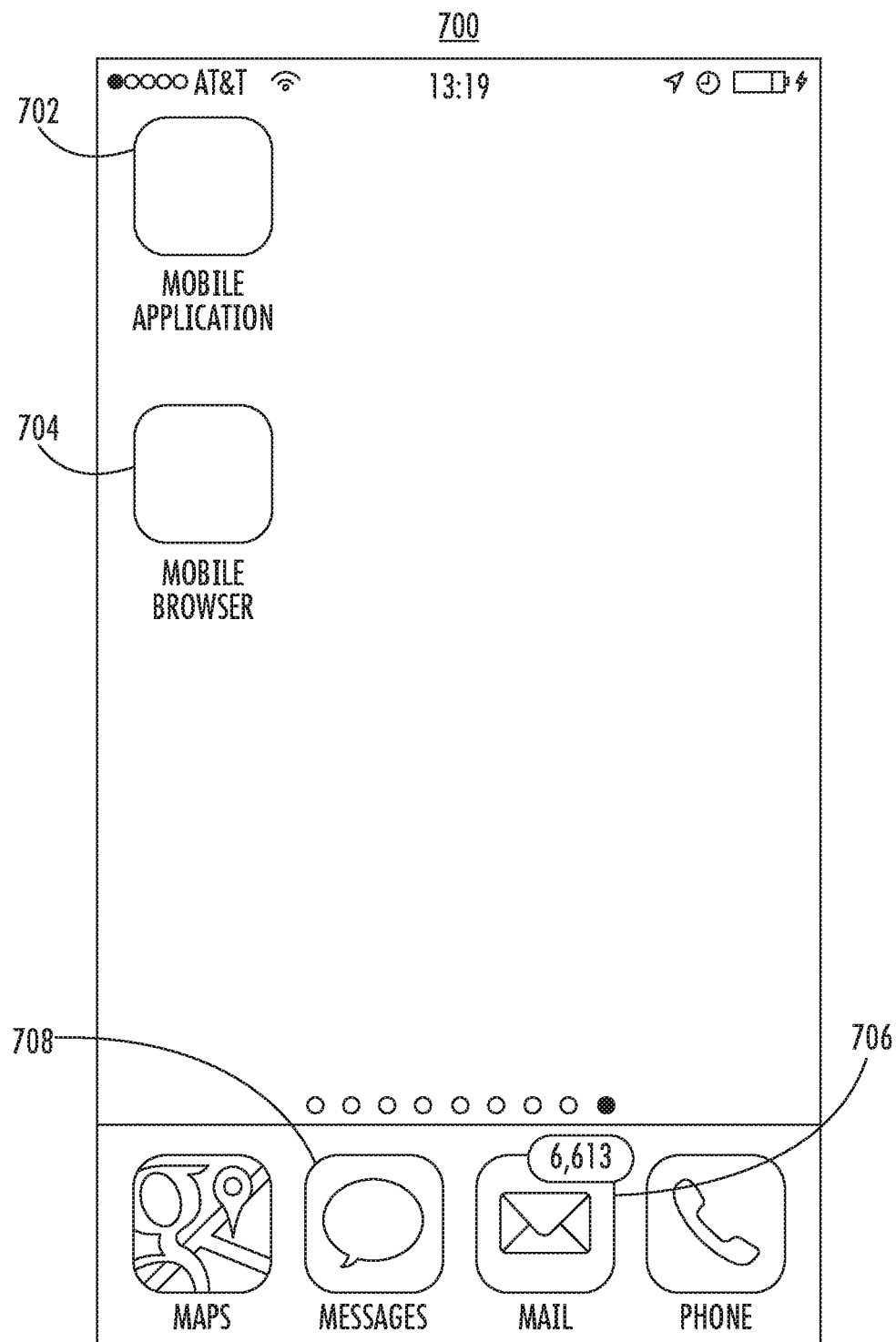
Figure 8:
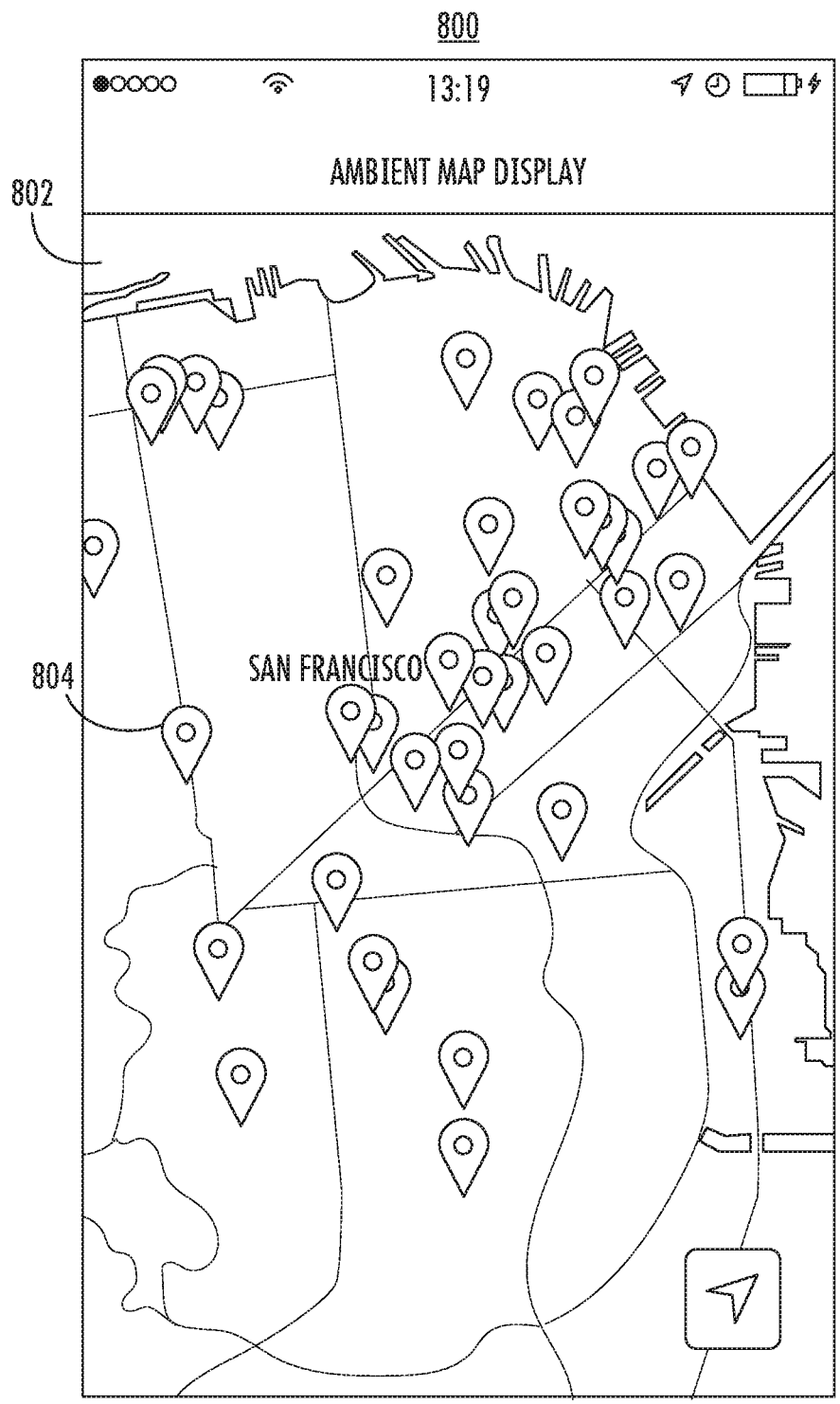
Figure 9:
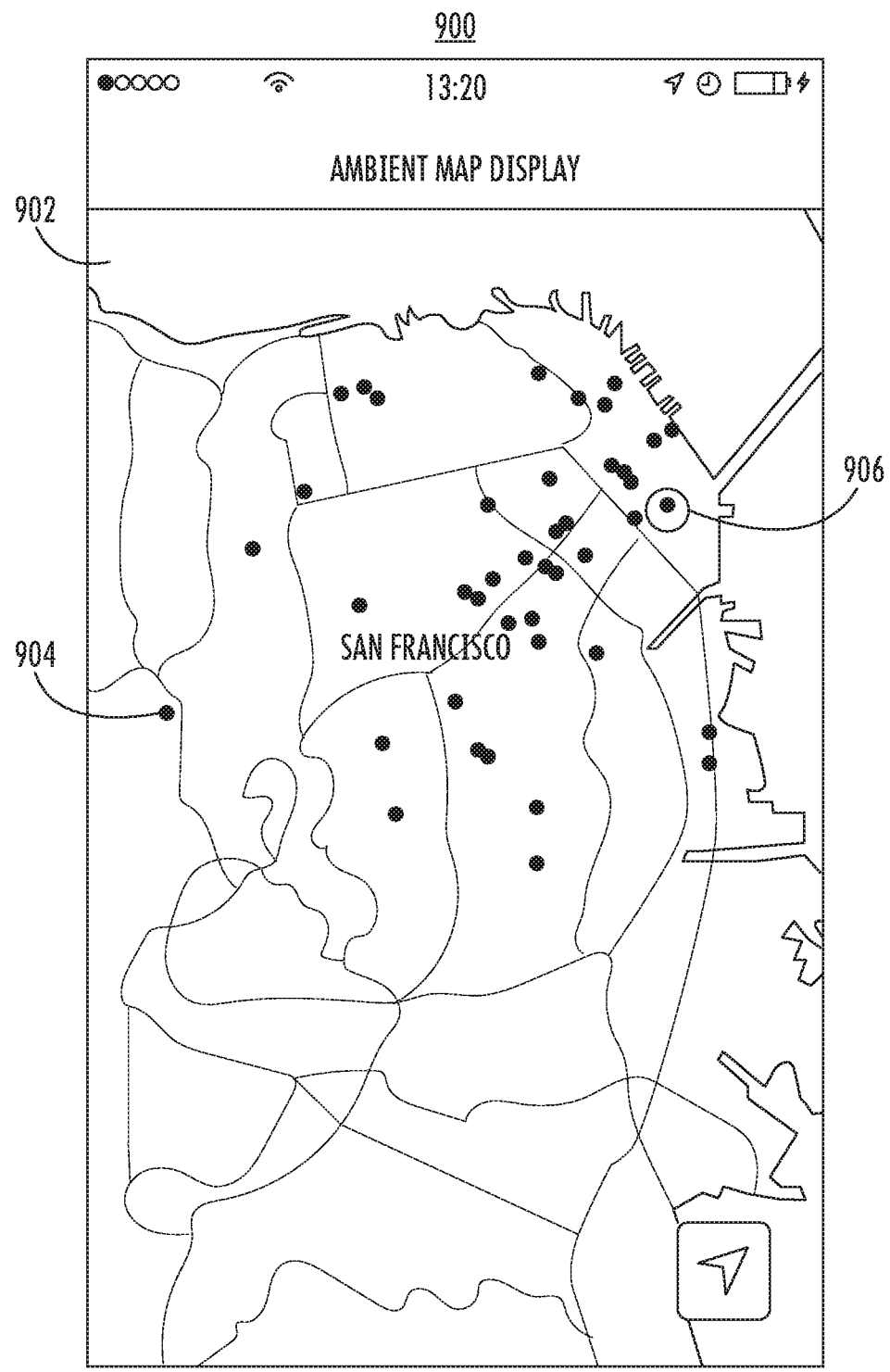
Figure 10:
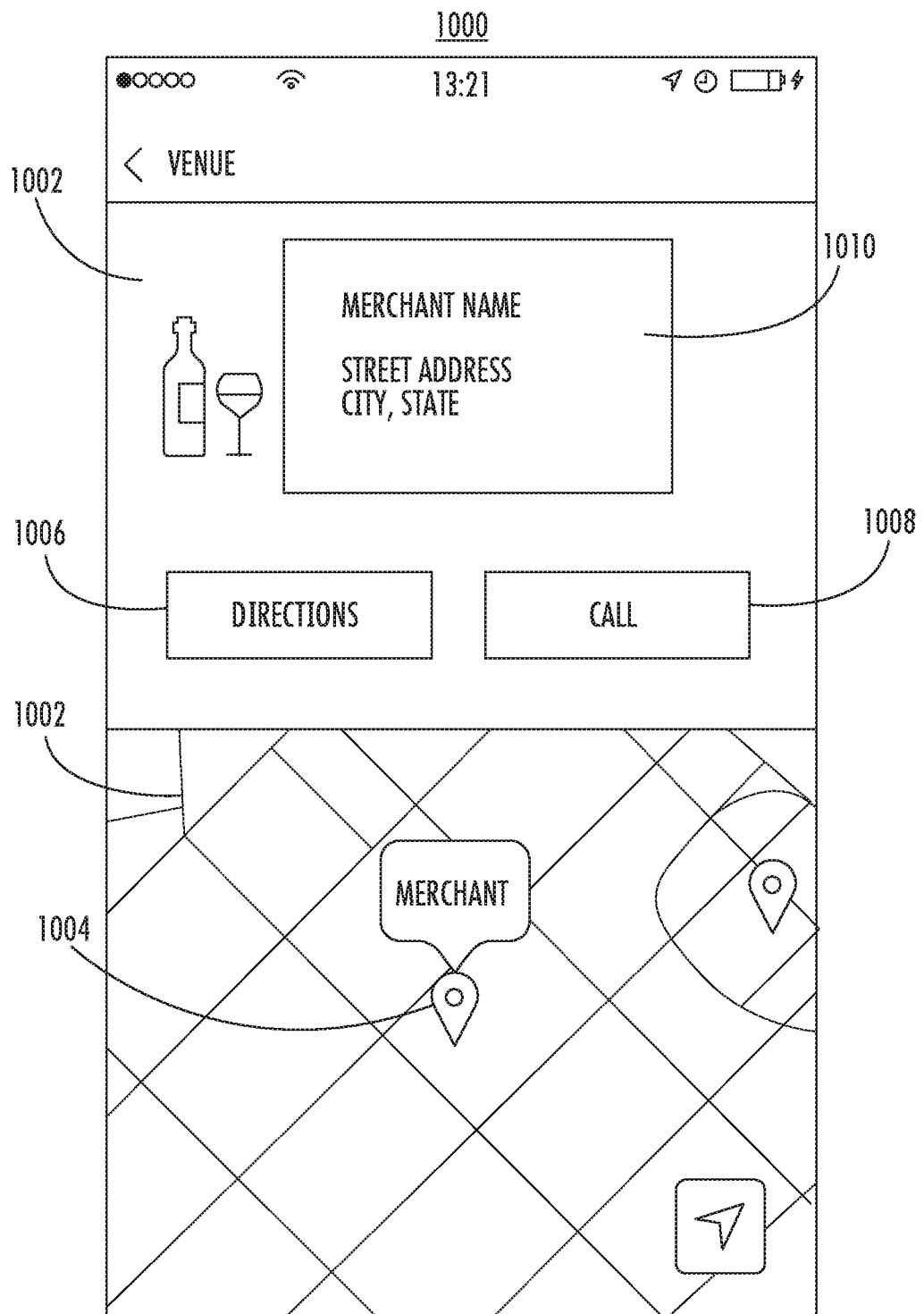
Figure 11:
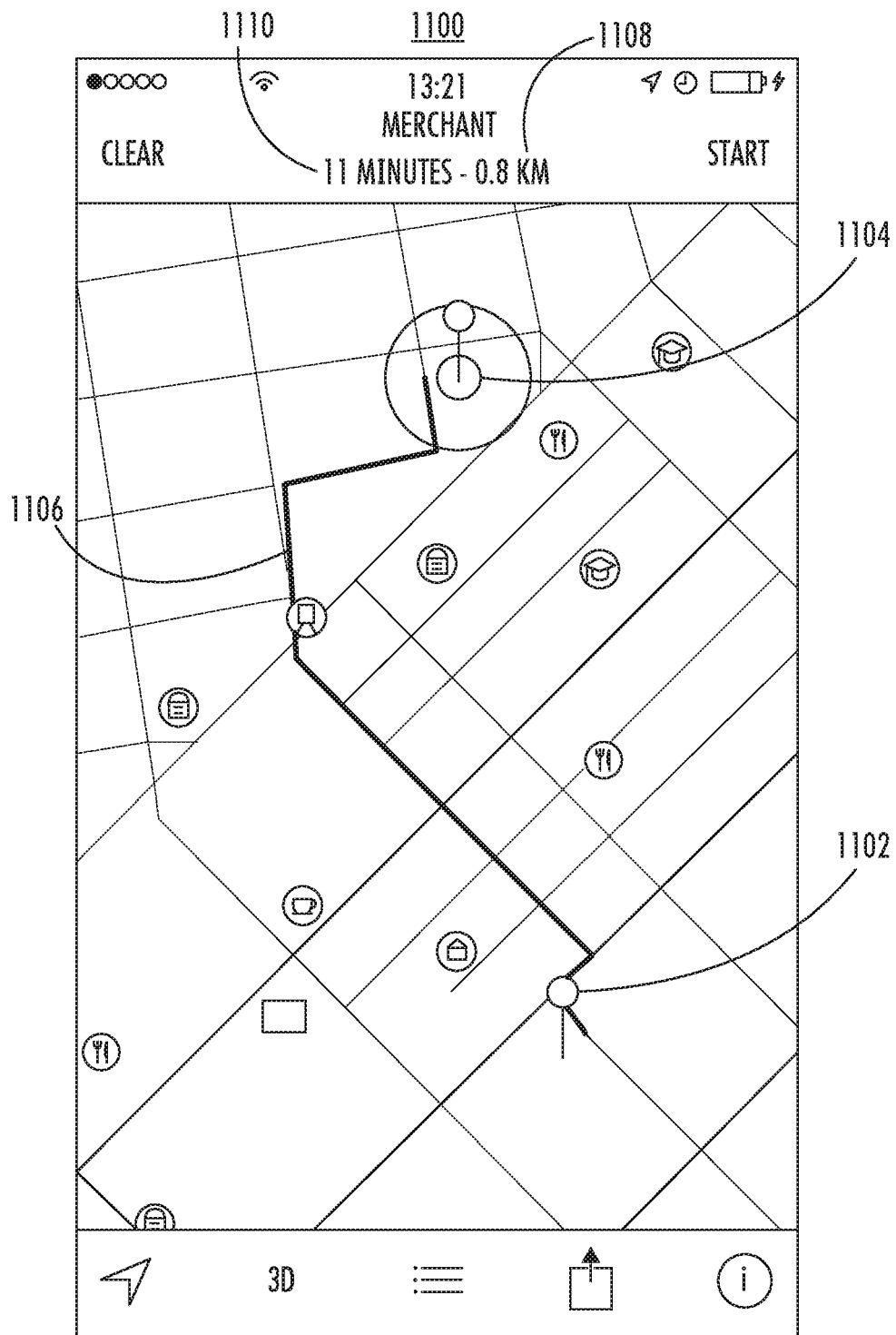

Having thus described some embodiments in general terms, reference will now be made to the accompanying drawings, which are not necessarily drawn to scale, and wherein:

FIG. 1 shows an example of a system configured in accordance with some embodiments;

FIG. 2 shows a schematic block diagram of example circuitry of a point-of-sale service configured in accordance with some embodiments;

FIG. 3 depicts an example data flow illustrating interactions between a server, one or more consumer devices, and one or more merchant devices in accordance with some embodiments;

FIG. 4 shows a schematic block diagram of example circuitry of a consumer device configured in accordance with some embodiments;

FIG. 5 shows a schematic block diagram of example circuitry of a merchant device configured in accordance with some embodiments;

FIG. 6 shows a flowchart of an example of a method of providing a consumer interface performed in accordance with some embodiments;

FIG. 7 shows an example home display of a consumer device in accordance with some embodiments;

FIG. 8 shows an example of an ambient map display in accordance with some embodiments;

FIG. 9 shows an example of an ambient map display in accordance with some embodiments;

FIG. 10 shows an example of a merchant display in accordance with some embodiments; and FIG. 11 shows an example of a directions display in accordance with some embodiments.

DETAILED DESCRIPTION

Some embodiments will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Overview

Some embodiments may provide for a computing system configured to facilitate improved consumer and merchant interactions. For example, the computing system may include one or more servers (e.g., of a central system) that are connected with merchant devices and consumer devices via a network (e.g., the Internet). The merchant devices may be point-of-sale devices located at merchant locations to facilitate point-of-sale functionality on behalf of consumers. The one or more servers may communicate with the merchant devices to receive transaction data generated via the point-of-sale functionality. Based on the transaction data, the one or more servers may be configured to generate a consumer interface and provide the consumer interface to a consumer device. In general, the consumer interface may include an indication of the activity level of merchants determined based on the received transaction data, and thus may be used by consumers to find merchants that fit consumer interests or mood.

For example, consumer interface may include an ambient map display with a graphical representation of a map. One or more local merchant location indicators indicating merchant locations that are near the consumer device may be indicated within the ambient map display. Furthermore, the ambient map display may indicate the activity level (e.g., based on an activity level score) for the one or more local merchant locations.

In that sense, a consumer may carry the consumer device while traveling through a city, neighborhood, or the like. The ambient map display may be updated based on the consumer device location, as well as based on real-time transaction data received form the consumer devices. Thus the consumer can determine real-time venue popularity to find a nearby party or a quiet spot, among other things. Some embodiments may further provide for improved and streamlined consumer interfaces for accessing and interacting with merchant data provided to consumer devices via a network.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "consumer interface service" may include a service that is accessible via one or more computing devices (e.g., mobile consumer devices) and that is operable to provide an electronic, interactive electronic user interface to the consumer devices. The consumer interface service may be connected with merchant devices and consumer devices via a network (e.g., the Internet). The consumer interface service may collect consumer tracking data (e.g., such as transaction data, location data, wallet identifying data that identifies a consumer device or consumer account, etc.) from the merchant devices and may programmatically process the consumer tracking data as discussed herein. The consumer interface may further provide the processed information to consumer devices based on consumer device location. In one example, the consumer tracking data may be processed to determine an activity level score for merchants. The activity level score for the merchants may be provided within the map display of the consumer interface of a consumer device based on consumer device location.

Furthermore, various merchant information associated with multiple (e.g., otherwise unaffiliated) merchants may be aggregated by the consumer interface service as discussed in greater detail herein.

As used herein, the term "point-of-sale service" or "POS service" may include a service that is accessible via one or more computing devices and that is operable to provide point-of-sale related services on behalf of one or more providers that offer goods, services, experiences and/or the like (or "items," as used herein). In some examples, the POS service may take the form of a payment processor, a menu generator, a tab or checkout manager, an inventory manager, an employee/payroll manager, a redemption authority, a rewards provider, an entity in a financial network, a promoter, an agent and/or the like. As such, the POS service is, in some example embodiments, configured to provide point-of-sale interfaces (e.g., including one or more menu displays, check-out screens, promotion or item recommendations, promotion redemption displays, etc.), provide consumer information to merchant devices to facilitate consumer service, generate menu displays that are tailored to consumer preferences, facilitate preparation of menu items, track merchant inventory levels and generate menus based on the inventory levels, process payments, order additional merchant inventory, and related activities.

In some embodiments, the POS service may be further configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The POS service may also, in some example embodiments, be configured to offer merchant services such as promotion building (e.g., assisting merchants with selecting promotion data parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the POS service only for the purpose of gathering marketing information, demographic information, or the like, or receiving point-of-sale functionality.

As used herein, the term "consumer" should be understood to refer to a recipient of goods, services, promotions, media, or the like provided by the POS service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the POS service, where the POS service receives the cost value for each promotion sold to a consumer. The promotion may also include a "return on investment" value, representing a quantified expected return on investment to the merchant for each promotion sold.

For example, consider a promotion offered by the POS service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or POS service. This $22.50 would be the residual value of the promotion. If the POS service charged the merchant $3.00 to offer the promotion, the $3.00 fee would be the "cost value." The "return on investment" value of the promotion might be dynamically calculated by the POS service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical credential (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a POS service to provide improved point-of-sale interfaces and/or electronic marketing communications. Electronic marketing information may include, without limitation, clickstream data (defined below), consumer tracking data (defined below), location data (defined below), communication channel data (defined below), discretionary data (defined below), real-time consumer device signals (defined below) or any other data stored by or received by the POS service for use in providing consumer interfaces and/or point-of-sale interfaces. In some embodiments, the electronic marketing information may further be used to provide electronic communications to consumers devices (e.g., within the consumer interface).

As used herein, the term "clickstream data" refers to electronic information indicating content viewed, accessed, edited, or retrieved by consumers. This information may be electronically processed and analyzed by a POS service to improve the quality of electronic marketing and commerce transactions offered by, through, and in conjunction with the POS service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a consumer device, merchant device, or the POS service. Transaction data may include information relating to the transaction. For example, transaction data may include consumer payment or billing information, consumer approval data (e.g., indicating consumer approval of a payment), consumer shipping information, items purchased by the consumer, a merchant rewards account number associated with the consumer, the type of shipping selected by the consumer for fulfillment of the transaction, or the like. In some embodiments, transaction data may include electronic data generated by merchant devices via merchant input to the point-of-sale interface provided by the POS service.

As used herein, the term "location data" refers to electronic information indicating a particular location. Location data may be associated with a consumer, a merchant, or any other entity capable of interaction with the POS service. For example, in some embodiments location data is provided by a location services circuitry, a location services module of a consumer mobile device, and/or location sensors (e.g., GPS, operating system location services, WiFi access point identification sensors, etc.) that are configured to generate electronic information or signals that are indicative of the context, position, or environment surrounding the consumer device. In some embodiments, location data may be provided by a merchant device to the POS system indicating the location of consumer devices within their retail location. In some embodiments, location data may be provided by merchant devices to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the POS service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the POS service), or any other data pertaining to the communication channel between the POS service and an entity external to the POS service.

As used herein, the term "discretionary data" refers to electronic information provided by a merchant or consumer explicitly to the POS service in support of improved interaction with the POS service. Upon registering with the POS service or at any time thereafter, the consumer or merchant may be invited to provide information that aids the POS service in providing services that are targeted to the particular needs of the consumer or merchant. For example, the discretionary data may include any suitable consumer information that can be used, such as consumer information related to health (e.g., undesirable ingredients such as allergy information, weight, blood pressure, etc.), habit information, consumer status, apparel size (e.g., shoe size, clothing size, etc.), color blindness, visual impairment, auditory impairment, price flexibility or price bands, transaction data (e.g., indicating past purchases), and/or environmental data (e.g., preferred weather, temperature, humidity, precipitation, etc.). A merchant may indicate the type of goods or services provided, their retail storefront location, ingredients or recipes for menu items, menu information, employee information, contact information, hours of operation, or the like.

It should be appreciated that the term "discretionary data" is intended to refer to information voluntarily and explicitly provided to the POS service, such as by completing a form or survey on a website or application hosted by the POS service. However, it should be appreciated that the examples of discretionary data provided above may also be determined implicitly or through review or analysis of other electronic marketing information provided to the POS service. It should also be appreciated that the POS service may also gate access to certain features or tools based on whether certain discretionary data has been provided. For example, the consumer may be required to provide information relating to their interests or location during a registration process.

As used herein, the term "real-time consumer device signals" refers to electronic information generated by sensor circuitry of a consumer device. For example, the sensor circuitry may include one or more environmental sensors (e.g., temperature, humidity, etc.), biological sensors (e.g., thermometer, heart rate monitor), visual sensors (e.g., a front facing camera configured to capture consumer expressions and/or gestures), and/or motion sensors (e.g., accelerometer, gyroscope, etc).

As used herein, the term "offering parameters" refers to terms and conditions under which a promotion is offered by a POS service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the POS service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a POS service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant data indicators (defined below) may be used to identify promotion offers that were generated by merchants with similar characteristics to the merchant data indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the POS service, or the like. Promotion components may also include various flags and settings associated with registration and verification functions for a merchant offering the promotion, such as whether the identity of the merchant has been verified, whether the merchant is registered with the POS service, or the like.

As used herein, the term "electronic marketing communication" refers to any electronically generated information content provided by the POS service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the POS service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the POS service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the POS service based on electronic marketing information to assist with the operation of the POS service and/or one or more merchant systems. The various streams of electronic marketing information provided to and by the POS service allow for the use of sophisticated data analysis techniques that may be employed to identify correlations, relationships, and other associations among elements of electronic marketing information. These associations may be processed and formatted by the POS service to provide reports, recommendations, and services both internal to the POS service and to merchants in order to improve the process by which merchants and POS service engage with consumers.

For example, the POS service may analyze the electronic marketing information to generate customized menu interfaces that facilitate consumer service. Based on the electronic marketing information, the POS service may generate menus that are relevant to real-time preferences, conditions or habits of the consumer. Furthermore, the POS service may identify an increased demand for a particular product or service, and provide an electronic report to a merchant suggesting the merchant offer the particular product or service, or update the menu interface to include, recommend, or otherwise present the particular product or service. In another example, the POS service may identify that a particular product or service is not selling or resulting in the merchant losing money, customers, or market share (e.g., after consumers order a particular menu item, they never come back to the merchant), and suggest that the merchant should discontinue offering that product or service or remove the product or service from the menu interface.

It should be appreciated that the term "business analytic data" is intended to refer to electronically and programmatically generated data. For example, a printed report or letter manually drafted by an employee of the service would not be said to include business analytic data, even if said data was used by the employee during the drafting process, while a data disk or downloaded file containing analytics generated by the POS service would be considered business analytic data. Human interaction requires time, resources, introduces errors, and is incapable of efficiently considering large data collections, and thus various embodiments discussed herein include solutions to some or all of these technical problems.

As used herein, "wallet identifying data," "digital consumer token" or "consumer device token" refers to a key, code, identifier, or the like, that uniquely identifies a consumer device and/or consumer account record. For example, consumer profiles and/or consumer information of a consumer account record may be associated with a digital consumer token. The digital consumer token may be passed from consumer devices to merchant devices, and used by the merchant devices to access consumer information associated with the digital consumer token (e.g., via an exchange with the POS service). As used herein, a "consumer account record" refers to a record of consumer information stored in one or more consumer account databases of the POS service.

Technical Underpinnings and Implementation of Exemplary Embodiments

Merchants, including manufacturers, wholesalers, and retailers, have spent a tremendous amount of time, money, manpower, and other resources to determine the best way to serve products and services to consumers. Whether a given consumer interaction is successful (at least from the merchant's perspective) is often determined based on the return-on-investment received to the merchant in terms of revenues, profits, and increased awareness of the merchant's goods and services when compared to the resources invested by the merchant to facilitate the consumer interaction. To this end, a merchant's financial resources may be spent in a variety of different manners including conducting market and consumer research, identifying consumers, tracking consumer preferences, purchases, behaviors, or habits, training employees, offering targeted products or services, advertising, offering of discounts, conducting market research, among other things. The end goal of these activities is to ensure that consumer information is programmatically leveraged during consumer and merchant interactions while minimizing the expense of the effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the point-of-sale process. As a result, new technologies have been developed to gather, aggregate, analyze, and report information from a variety of electronic sources.

So-called "clickstream data" or "electronic marketing data" provides a robust set of information describing the various interactions consumers have with electronic marketing information provided to them by merchants and others. The POS service may be developed with sophisticated technologies that are configured to receive and process this data for the benefit of both merchants and consumers. The POS service may assist merchants with marketing or otherwise presenting their products to interested consumers, while reducing the chance that a consumer will be presented with marketing or menu information in which the consumer has no interest. The POS service may further leverage its access to the trove of electronic marketing information to assist merchants and consumers with other tasks, such as offering improved consumer profile and information management, improved merchant inventory and supply chain management, improved point-of-sale interfaces and menu displays, improved methods for delivering products and services, improved consumer interfaces for interacting with merchant data via consumer devices, and the like.

Unlike conventional techniques related to the use of paper or other physical media (e.g., paper menus or merchant listings), the POS service may offer a wealth of additional electronic solutions to improve the experience for consumers and merchants. The ability to closely monitor consumer interactions (e.g., with impressions, transactions data generated at merchant locations, location data indicating consumer location, etc.) provides the ability for the POS service to gather data related to the time, place, and manner in which consumers engaged with the electronic data (e.g., viewed, clicked, provided a payment via a consumer device, approved a payment via a communication with a merchant device, moused-over an impression and obtained and redeemed the promotion). The POS service may use this information to determine which merchants, products, and services are most relevant to the consumer's interest, and to provide consumer interfaces (e.g., including materials related to said products and services) to the consumer, thus improving the efficiency of the electronic marketing communications received by the consumer device. Advantageously, the techniques discussed herein provides for increased efficiency of network based communications through targeting of electronic data based on relevance. Similarly, electronic data that is less relevant or not relevant to the consumer is not sent via the network to the consumer interfaces, thereby reducing system processing requirements and network congestion, and increasing throughput of relevant electronic data via the network. The POS service may additionally or alternatively use this information to generate point-of-sale interfaces and menu displays that are targeted to the consumer, thus improving the quality a consumer's experience at a merchant shop.

Although electronic marketing information provides a wealth of information, the inventors have determined that existing techniques may not always leverage or process this information in an efficient or accurate manner. Technology continues to rapidly advance in the field of analytics and the processing of this information, offering improved data gathering and analysis techniques, resulting in more relevant and accurate results provided in a more efficient manner. Point-of-sale services continue to evolve and provide improved methods for engaging consumers and spreading awareness of products offered by the point-of-sale services.

In many cases, the inventors have determined that these services are constrained by technological obstacles unique to the electronic nature of the services provided, such as constraints on data storage, machine communication, interoperability, and processor resources. The inventors have identified that the wealth of electronic data available to these services and the robust nature of point-of-sale techniques present new data, network, and communication challenges never contemplated in the world of paper menus and physical marketing techniques (e.g., paper coupons). The inventors have further determined that even technological methods that leverage computers for statistical analysis and consumer behavior modeling (e.g., television rating systems) fail to address problems associated with providing relevant, high quality point-of-sale and/or consumer interfaces in a manner that maximizes accuracy, minimizes error, is user friendly and provides for efficient allocation of resources. Embodiments of the present invention as described herein serve to correct these deficiencies and offer improved resource utilization, thus providing improvements to electronic point-of-sale and/or consumer interface services that address problems arising out of the electronic nature of those services. For example, various embodiments may provide for hyperlocal consumer interfaces that are responsive (e.g., in real-time) to consumer device locations as well as merchant device activity, accurate and secure electronic authentication of consumers with little or no direct consumer action, accurate capture of item level data associated with transactions, accurate item or promotion targeting based on merchant and consumer information, sharing of consumer account data between merchants, among other things.

System Architecture and Example Apparatus

Methods, apparatuses, and computer program products of the present invention may be embodied by any of a variety of devices. For example, some embodiments may include a networked device, such as one or more servers or other network entity, configured to communicate with one or more devices, such as one or more client devices. A client device may include a fixed computing device, such as a personal computer or a computer workstation. In another example, a client device may include a mobile terminals, such as a portable digital assistant (PDA), mobile telephone, wearable device, smart watch, electronic eyewear, smartphone, laptop computer, tablet computer, or any combination of the aforementioned devices.

In this regard, FIG. 1 shows an example computing system 100 within which embodiments of the present invention may operate. System 100 may include POS service 102 including one or more servers 104 and one or more database 106. POS service 102 may be connected with client devices via network 112 (e.g., the Internet), such as consumer devices 108A-108N and merchant devices 110A-110N. The consumer devices 108A-108N may each be associated with different consumer accounts, such as based on POS service receiving login data (e.g., username, password, biometric identifier, etc.) associated with the consumer accounts from the consumer devices. In some embodiments, consumer devices 108A-108N may be mobile devices such as smartphones that can be readily carried by the consumer while remaining (e.g., at least intermittently) in communication with the POS service 102 via network 112.

Server 104 may be a single server or may be multiple (e.g., distributed) servers, and may provide for the receiving of electronic data from various sources, including but not necessarily limited to the consumer devices 108A-108N and the merchant devices 110A-110N. For example, the server 104 may be operable to receive and process electronic marketing information provided by the consumer devices 108 and/or the merchant devices 110. The server 104 may also facilitate e-commerce transactions based on transaction information provided by the consumer devices 108 and/or the merchant devices 110. For example, server 104 may generate a consumer interface including an ambient map display as discussed herein and provide the consumer interface to consumer devices. The server 104 may facilitate the generation and providing of various point-of-sale interfaces and menu displays, or electronic communications and marketing materials based on the received electronic data.

The database 106 may be embodied as one or more data storage devices such as a Network Attached Storage (NAS) device or devices, or as a separate database server or servers. The database 106 may include consumer data and/or merchant data accessed and stored by the server 104 to facilitate the operations of the POS service 102. In some embodiments, consumer data associated with consumer account records may be stored in one or more consumer databases and merchant data associated with merchants may be stored in one or more separate merchant database. In some embodiments, the database 106 may include, without limitation, consumer account credentials for system administrators, one or more consumer profiles and related data (e.g., consumer preferences, information sharing rules, etc.), associations between consumer profiles and consumer identifying tokens, merchants, and consumers, data indicating the products and promotions offered by the POS service, menu item data, inventory data, employee information (e.g., skills, specializations, organizational role, shift or payroll data, background or employee profile information, etc.) clickstream data, transaction data, discretionary data, analytic results, reports, financial data, and/or the like.

The consumer devices 108A-108N may include computing device that are associated with and/or operated by a consumer. Electronic data received by the server 104 from the consumer devices 108A-108N may be provided in various forms and via various methods. As discussed above, a consumer device 108 may be a mobile device, such as a smart phone or tablet, the consumer device 108 may execute a mobile device application (an "app" or "mobile app") to interact with the POS service 102. Such apps are typically designed to execute on mobile devices, such as tablets or smartphones. For example, a mobile software application or "app" may be provided that executes on mobile device operating systems such as Apple Inc.'s $^{iOS}$®, Google Inc.'s Android °, or Microsoft Inc.'s Windows 8®. These platforms typically provide operating system frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The POS service 102 may leverage the application framework offered by the mobile operating system to allow consumers to designate which information is provided to the app and which information may then be provided to the POS service 102. In some embodiments, consumers may "opt in" to provide particular data to the POS service 102 in exchange for a benefit, such as improved relevancy of marketing communications offered to the user. In some embodiments, the consumer may be provided with privacy information and other terms and conditions related to the information provided to the POS service 102 during installation or use of the app. Once the consumer provides access to a particular feature of the mobile device, information derived from that feature may be provided to the POS service 102 to improve the quality of the consumer's interactions with the POS service and merchant devices.

For example, the consumer may indicate that they wish to provide location information to the app from location services circuitry included in their mobile device. Providing this information to the POS service 102 may enable the POS service 102 to provide consumer interfaces that are relevant to the particular location of the consumer device (e.g., by providing promotions or other information for merchants proximate to the consumer's current location). It should be appreciated that the various mobile device operating systems may provide the ability to regulate the information provided to the app associated with the POS service 102. For example, the consumer may decide at a later point to disable the ability of the app to access the location services circuitry, thus limiting the access of the consumer's location information to the POS service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion, or leverage social networking data to generate or update consumer information (e.g., one or more consumer profiles). It should be appreciated that the use of mobile technology and associated app may provide for particularly unique and beneficial uses of the POS service through leveraging the functionality offered by the various mobile operating systems.

Additionally or alternatively, the consumer device 108 may interact through the POS service 102 via a web browser. As yet another example, the consumer device 108 may include various hardware or firmware designed to interface with the POS service 102 (e.g., where the consumer device 108 is a purpose-built device offered for the primary purpose of communicating with the POS service 102, such as a store kiosk).

The merchant devices 110A-110N may be computing devices that are associated with and/or operated by a merchant. For example, the merchant devices 110A-110N may include a merchant point-of-sale device, a merchant e-commerce server, a merchant inventory system, or a computing device accessing a web site or app designed and configured to provide point-of-sale functionality (e.g., by accessing a POS service server 104 through an app or a web page via a browser using a set of merchant account credentials). Electronic data received by POS service 102 from the merchant devices 110A-110N may also be provided in various forms and via various methods. For example, the merchant devices 110A-110N may provide menu data or menu item data (e.g., items offered, ingredients, price, etc.), or real-time transaction data and/or inventory information as purchases are made from the merchant. In other embodiments, the merchant devices 110A-110N may be employed to provide information to the POS service 102 to enable the POS service 102 to generate promotions or other marketing information to be provided to consumer devices via network 112.

An example of a data flow for exchanging electronic information among one or more consumer devices, merchant devices, and the POS service is described below with respect to FIG. 3.

Example Apparatus[es] For Implementing
Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, consumer interface service circuitry 210, point-of-sale service circuitry 212, and data collection circuitry 214. The apparatus 200 may be configured to execute the operations described above with respect to FIG. 1 and below with respect to FIG. 6. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

As discussed in greater detail below, consumer interface service circuitry 210 include hardware configured to generate and/or provide consumer interfaces to consumer devices. Point-of-sale service circuitry 212 may include hardware configured to provide point-of-sale interfaces to merchant devices. For example, a point-of-sale interface for a restaurant merchant may include a menu display including selectable menu items. In some embodiments, point-of-sale service circuitry 212 may be further configured to facilitate menu item preparation, such as by providing menu item data (e.g., indicating ingredients and/or amounts of the ingredients of a menu item) to a kitchen display. Data collection circuitry 214 may include hardware configured to collect electronic marketing information (e.g., discretionary data, clickstream data, transaction data, consumer location data, real-time consumer device signals, etc.), which may be used by data collection circuitry 214 to update the consumer interface of a consumer device and/or a merchant POS interface of a merchant device.

In some embodiments, circuitry 210-214 may utilize processing circuitry, such as the processor 202, to perform these actions. However, it should also be appreciated that, in some embodiments, one or more of circuitries 210-214 may include a separate processor, specially configured field programmable gate array (FPGA), or application specific interface circuit (ASIC). Circuitry 210-214 may therefore be implemented using hardware components of the apparatus configured by either hardware or software for implementing these programmatic functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Consumer device(s) 108 may be embodied by one or more computing systems, such as apparatus 400 shown in FIG. 4. The depicted apparatus 400 includes processor 402, memory 404, input/output circuitry 406, communications circuitry 408, and consumer interface circuitry 410. The apparatus 400 may be configured to execute the operations described herein with respect to FIGS. 1 and 6. The functioning of the processor 402, the memory 404, the input/output circuitry 406, and the communication circuitry 408 may be similar to the similarly named components described above with respect to FIG. 2. For the sake of brevity, additional description of these components is omitted.

Consumer interface circuitry 410 may include hardware configured to provide a consumer interface on device 400. In some embodiments, consumer interface circuitry 410 may communicate with consumer interface service circuitry 214 of server 104 to provide the consumer interface. In some embodiments, consumer interface circuitry 410 may be configured to perform some or all of the techniques discussed herein with respect to consumer interface service circuitry 210. For example, the consumer interface circuitry 410 may receiver consumer device inputs via the network and may process the consumer device inputs to programmatically manipulate the consumer display as discussed herein. In some embodiments, consumer interface circuitry 410 may be further configured to generate consumer device location data indicating the location of a consumer device and provide the consumer device location data to server 104 as an input to the POS service 102. For example, consumer interface circuitry 410 may use cell-tower triangulation, global positioning systems (GPS), internet protocol (IP) address, and/or any other suitable technique to determine the consumer device location data.

Merchant device(s) 110 may be embodied by one or more computing systems, such as apparatus 500 shown in FIG. 5. The depicted apparatus 500, which may be configured for use at a merchant location (e.g., a storefront, shop, restaurant, merchandise storage, warehouse, etc.), may include processor 502, memory 504, input/output circuitry 506, communications circuitry 508, and point-of-sale circuitry 510. The functioning of the processor 502, the memory 504, the input/output circuitry 506, and the communication circuitry 508 may be similar to the similarly named components described above with respect to FIG. 2. For the sake of brevity, additional description of these components is omitted.

Point-of-sale circuitry 510 may include hardware configured to provide the point-of-sale interface on the merchant device. In some embodiments, point-of-sale circuitry 510 may communicate with point-of-sale service circuitry 214 of server 104. In some embodiments, point-of-sale circuitry 510 may be configured to perform some or all of the techniques discussed herein with respect to point-of-sale service circuitry 214. In some embodiments, point-of-sale circuitry 510 may be configured to facilitate menu creation, inventory management, employee and enterprise management functionality (e.g., time keeping, payroll, etc.), menu item or inventory preparation, etc.

Example Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with some embodiments. The one or more consumer devices 304 and/or one or more merchant devices 306 may provide a variety of electronic marketing information to the server 302 for use in providing the consumer interface service to consumer devices. This electronic marketing information may include, but is not limited to, location data, clickstream data, transaction data, communication channel data, and/or discretionary data.

In some embodiments, server 302 may generate a digital consumer token associated with one or more consumer profiles and provide the digital consumer token to consumer device 304. When consumer device 304 shares the digital consumer token with merchant device 306, which merchant device 306 may pass the digital consumer token to server 304. In response, server 304 may return a point-of-sale interface configured to facilitate consumer interactions based on the consumer information associated with the consumer profile. In another example, server 304 may provide consumer profile information and/or business analytic data relevant to the consumer to merchant device 306 based on receiving the digital consumer token identifying the consumer account or profile(s). In that sense, the POS service may allow a consumer carrying consumer device 304 to enter within a proximity of a merchant shop and/or to enter a merchant shop (e.g., with consumer device 304 being configured to broadcast a digital consumer token) to receive personalized, customized or targeted service without requiring additional consumer interactions with consumer device 304, the merchant, or merchant device 306 that may interrupt, inconvenience or otherwise complicate the real-time consumer merchant interaction.

In some embodiments, as a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of the consumer interface provided to consumer device. For example, the server 302 may determine promotions, goods, and services that are more likely to be of interest to a particular consumer or group of consumers based on clickstream data, discretionary data, transaction data, location data, and other information provided by and/or relating to particular consumers. For example, the server 302 may detect the location of a consumer based on location data provided by the consumer device, and provide merchant information based on the proximity of the consumer to the merchants.

Alternatively, the server 302 may note that the consumer has an interest in a particular hobby (e.g., skiing) based on electronic marketing information associated with the consumer (e.g., profile information, discretionary data provided by the consumer, clickstream data such as a browser cookie that indicates they frequently visit websites that provide snowfall forecasts for particular ski resorts), prior transaction data, and offer promotions or items associated with that hobby (e.g., a promotion offering discounted ski equipment rentals or lift tickets). It should be appreciated that a variety of different types of electronic marketing information could be provided to the server 302 for the purpose of improving the relevancy of point-of-sale interfaces and/or consumer interfaces (e.g., including electronic marketing communications). It should also be appreciated that this electronic marketing information may be received from a variety of electronic sources, including various consumer devices, merchant devices, and other sources both internal and external to a POS service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

The server 302 interactions with the one or more merchant devices 306 may be related to enabling the merchant to provide point-of-sale related services to consumers using the POS service. For example, the one or more merchant devices 306 may provide product data, menu item data, inventory data, and/or employee data to server 302. The sever 302 may receive this information and generate menu displays or point-of-sale interfaces that may be provided to merchant devices 306 Additionally or alternatively, consumer interfaces, map displays, merchant displays, and/or menu displays may be provided to consumer devices 304, such as for merchant browsing, online ordering, consumer self-service, etc.

In some embodiments, merchants may market their products using a POS service. For example, the one or more merchant devices 306 may provide promotion data defining one or more promotions to be offered by the POS service on behalf of the merchant. The server 302 may receive the promotion data and generate electronic marketing communications for providing such promotions via an e-commerce interface, making the promotions available for purchase by consumers. The server 302 may also receive product/inventory data about products from the one or more merchant devices 306. For example, a merchant may product/inventory data indicating particular products, product prices, inventory levels, and the like to be marketed via a POS service. The server 302 may receive this information and generate electronic marketing communications to offer the products to consumers. As discussed in greater detail herein, the electronic marketing communications may take the form of a consumer interface including ambient map displays of local merchants with indications of real-time merchant activity level, among other things.

The one or more merchant devices 306 may also receive information from the server 302. For example, in some embodiments a merchant may obtain access to certain consumer information and/or business analytic data aggregated, generated, or maintained by the server 302. As a particular example, a merchant's menu or point-of-sale interface may be customized based on the consumer information such as for ranking or ordering menu items within the point-of-sale interface, removing menu items including disfavored ingredients, etc.

Ambient Discovery of Merchants

Some embodiments may provide consumer interfaces that include hyperlocal merchant information to consumer devices via network. Hyperlocal information, as used herein, refers to information that is relevant to a particular location and time. For example, a central system (e.g., including one or more networked servers such as system 102) and/or consumer device may be configured to provide a consumer interface to a consumer device. The consumer interface may include a map display with an indication of local merchant locations. The system may communicate with merchant devices associated with the local merchant locations to receive transaction data. Based on the transaction data, the system may be configured to programmatically determine relevant merchant statuses and activity and to provide such merchant information to the consumer interface.

For example, when a consumer traverses a city while carrying the consumer device, the consumer device may be configured to share location data indicating the location of the consumer device to the central system. Based on the location data, the consumer interface may be updated in real time to provide information associated with nearby merchants. In some embodiments, based on transaction data, an activity level score for each merchant may be determined and indicated within the consumer interface. Advantageously, such information may be leveraged by consumers to match merchants with consumer interests. For example, the transaction data may be used to determine an activity level score for each merchant so that consumers can select between busier or quieter dine-in restaurant merchants.

FIG. 6 shows a flowchart of an example of a method 600 of providing a consumer interface performed in accordance with some embodiments. Method 600 is described as being performed by components of computing system 100. For example, some or all of the steps of method 600 may be performed by one or more servers 104 and/or a consumer device 108 of system 100. In some embodiments, method 600 may be performed by one or more other suitably configured servers, apparatuses, storage devices, routers, network switches, etc. Furthermore, it is appreciated that one or more of the steps discussed herein as being performed by servers 104 may be performed by a consumer device 108.

Method 600 may begin at 602 and proceed to 604, where one or more servers 104 may be configured to communicate with merchant devices and consumer devices via a network. For example, communications circuitry 208 of one or more servers 104 may be configured to connect with merchant devices 110A-N and consumer devices 108A-N via network 112 (e.g., the internet). Merchant devices 110A-N may be associated with one or more different merchants. In some embodiments, the connection between the one or more servers 104 and a consumer device 108 may include a wireless connection, such as a mobile broadband or other wireless Internet connection. Here, the consumer device may be capable of maintaining (e.g., at least intermittently) the connection with the one or more servers as the consumer is carrying the consumer device.

At 606, the one or more servers 104 may be configured to associate the merchant devices with a plurality of merchant device locations. For example, each of merchant devices 110A-N may be physically located at a particular merchant device location such as a merchant's storefront, shop, restaurant, warehouse, etc. Server 104 may receive merchant location data from a merchant device 110, and may be configured to determine the merchant device location based on the merchant location data received from merchant device 110. The merchant location data may be determined using any suitable technique including cell-tower triangulation, global positioning systems (GPS), internet protocol (IP) address, or merchant device data input (e.g., in a registration or configuration process for the merchant device).

In some embodiments, server 104 may connect with merchant devices associated with multiple different merchants. As such, server 104 and or POS service 102 may serve as a central system that provides interoperability between merchant devices and consumer devices. Furthermore, server 104 and or POS service may act as an aggregator and processor of merchant and/or consumer data, and may leverage such data to provide "big data" analytics to smaller merchants that would otherwise be unable to procure or leverage such data.

In some embodiments, the associations between merchant devices and merchant device locations may be stored in a merchant database, such as database 106 of POS service 102. For example, each merchant device may be associated with a merchant device identifier that uniquely identifies the merchant device. Furthermore, each merchant device may be associated with a merchant identifier that uniquely identifies the merchant, and the merchant location data that indicates the location of the merchant device. In some embodiments, a single merchant or merchant location may be associated with multiple merchant devices. For example, a restaurant merchant may provide merchant devices to each member of the wait staff to facilitate point-of-sale functionality such as taking orders, creating tabs, facilitating payments, etc. In some embodiments, POS service 102 may be configured to provide a POS interface to the merchant devices to perform the point-of-sale functionality. Additional details regarding POS interfaces, applicable in some embodiments, are discussed in U.S. patent application Ser. No. 13/794,529, titled "Consumer Device Based Point-Of-Sale," filed Mar. 13, 2013, which is incorporated by reference herein in its entirety.

At 608, the one or more servers 106 may be configured to associate a consumer device with a consumer account. For example, the consumer device may be associated with a consumer account record of a consumer database, such as database 106 of POS service 102. In some embodiments, the consumer device may be associated with the consumer account record based on server 106 receiving login data (e.g., username, password, biometric identifier, etc.) associated with the consumer account record from the consumer device via the network. The login data may be generated by the consumer device via a consumer device input (e.g., to a touchscreen, touch pad, keyboard, mouse, fingerprint reader, etc.), or in another example, may be stored within a memory of the consumer device and provided to server 106 without requiring the consumer device inputs.

At 610, the one or more servers 106 may be configured to receive, via the network, transaction data from the merchant devices. The transaction data may include electronic information indicating that a transaction is occurring or has occurred at the merchant locations associated with the merchant devices. As discussed in greater detail below, the transaction data received from a merchant device may be used to determine various real-time merchant statuses, such as a merchant activity level score indicating the frequency of transaction and thus the real-time activity level of the merchant.

The merchant device may be configured to generate transaction data for each transaction processed by the point-of-sale interface on the merchant device. In some embodiments, the transaction data may include simply an indication of a completed transaction. The merchant devices 110 may be configured to push the transaction data to the one or more servers 106, such as in real-time as the transaction data is generated by the point-of-sale functionality. Advantageously, the indication of the completed transaction does not require the networked transmission of other transaction details that may otherwise congest the network, thereby providing increased efficiency of networked data transfers with greater reliability and throughput.

In some embodiments, the transaction data may include additional information such as consumer approval data (e.g., indicating consumer approval of a payment), the item(s) purchased by the consumer, a payment amount, consumer payment or billing information, etc. The transaction data may further include a merchant rewards account number associated with the consumer (e.g., for reward tracking), the type of shipping selected by the consumer for fulfillment of the transaction (e.g., where an item is to be shipped to the consumer), redemption data indicating a redemption of a promotion or reward, among other things. Here, the POS service 102 may be configured to track the transaction data as electronic marketing information to generate (e.g., targeted) electronic marketing communications to consumer devices. Additionally or alternatively, the POS service 102 may be configured to facilitate the processing of payment data to complete transactions on behalf of the merchants.

In some embodiments, the transaction data may be secured with wallet identifying data. For example, the transaction data may include, be encrypted with, and/or electronically signed with a consumer device token. The one or more servers 106 may generate the wallet identifying data and may provide the wallet identifying data to the consumer device. In the process of performing a transaction, the consumer device may share the wallet identifying data with a merchant device. When the secured transaction data is received from the merchant device, server 106 may be further configured to facilitate payments based on processing the secured transaction data using wallet identifying data stored by the POS service 102 (e.g., within database 106). Additional details regarding the creation of transaction data using wallet identifying data, applicable in some embodiments, are discussed in U.S. patent application Ser. No. 13/875,019, titled "Consumer Device Based Point-Of-Sale," filed Mar. 12, 2013, U.S. patent application Ser. No. 13/801,520, titled "Peer-to-peer payment processing," filed Mar. 12, 2013, and U.S. patent application Ser. No. 13/764,753, titled "Consumer Device Payment Token Management," each of which is incorporated by reference herein.

At 612, the one or more servers 106 may be configured to determine an activity level score for each of the plurality of merchant locations based on the transaction data. The activity level score of a merchant location may be a "current activity level score" that indicates the amount of activity that is occurring in real-time at the merchant location. In that sense, the activity level score may provide an indication as to whether a merchant location (e.g. a restaurant, venue, etc.) is lively or quiet. In some embodiments, the activity level score may be a "projected activity level score" that indicates an estimate or prediction regarding the amount of activity that will occur at a future time at the merchant location. As discussed in greater detail below, the activity level score of a merchant location may be provided via a consumer interface to consumer devices based on consumer device location.

In some embodiments, the activity level score may be determined based on an average rate of received transaction data instances for a predetermined period of time. For example, a current activity level score may be determined by evaluating transaction data associated with the most recent predetermined period of time that has been received from a merchant device. For example, the activity level score may be determined by tracking the number of instances of transaction data received by the one or more servers 106 from one or more merchant device in the past hour. Thus a higher activity level score may indicate a greater number of transactions within the predetermined time (e.g., the past hour) while a lower activity level score may indicate a smaller number of transactions within the predetermined time. Other periods of time may be used, such as 10 minutes, 20 minutes, two hours, day, etc. In another example, a projected activity level score may be determined by using transaction data associated with a representative predetermined period of time to a future time.

In some embodiments, the activity level score may be a projected activity level score determined by using transaction data associated with one or more predetermined periods of time that is representative of a future time. For example, the one or more servers 106 may be configured to track the transaction data associated with a merchant or merchant location received from one or more associated merchant devices over time. Based on the tracked transaction data, an estimated or expected activity level may be determined. For example, the activity level of a merchant location can be tracked for the hours between 11 AM and 2 PM to determine an estimated or expected activity level of a restaurant merchant during lunchtime. As such, when the current time is determined to be applicable to the tracking time (e.g., the lunchtime hours), server 106 may determine the activity level for lunchtime of the merchant location accordingly. In addition or alternative to tracking based on time of day, the tracking may be performed based on other criteria such as the day of the week, the time of month or year (e.g., for merchants affected by seasonality), holidays, special events (e.g., a local concert, game day at a nearby stadium), etc. For example, if the current day is Tuesday, transaction data from one or more previous Tuesdays might be used. In another example, if the current time is 4 PM and its Monday thru Thursday, then transaction data from other week days at that time may be used. In yet another example, local event data (i.e., an event at a nearby venue ends at 6 PM) or seasonality (i.e., summer activity for certain locations could be quite different than winter activity) data may also be used to determine an activity level score for a current or projected time.

In some embodiments, the activity level score may include an average or other algorithmic transformation of both the average rate of received transaction data for a predetermined period of time preceding the current time and the estimated activity level for the current time.

In some embodiments, the activity level score may be determined based on factors other than or in additional to the number of transaction per time. For example, the server may be configured to determine the activity level score based on the values of the transactions indicated by the transaction data. Here, a higher activity level score may indicate a greater volume of sale revenue in terms of dollars or other credits. In another example, the activity level score may be based on the number of consumer devices that enter and/or come within proximity to a merchant shop per time. For example, a consumer device may be configured to transfer wallet identifying data to a merchant device and/or communication beacon located at a merchant shop via proximity-based wireless direct connection with the merchant device and/or communication beacon. Some suitable technologies that may be used to facilitate the transfer or the wallet identifying data (or other consumer device identifier) may include Bluetooth LTE, WiFi access point, and/or near field communication. Additional details regarding consumer device location tracking at a merchant location, applicable in some embodiments, are discussed in U.S. patent application Ser. No. 14/248,676, titled "Communication Beacon Based Promotions for Mobile Devices," filed Apr. 9, 2014, which is incorporated by reference herein in its entirety.

At 614, the one or more servers 106 may be configured to receive, via the network and from the consumer device, consumer device location data indicating a consumer device location of the consumer device. As discussed above, the consumer device location data may be determined using any suitable technique including cell-tower triangulation, global positioning systems (GPS), internet protocol (IP) address, consumer device inputs, receiving wallet identifying data from a merchant device (e.g., that received the wallet identifying data from a nearby consumer device) associated with a merchant location, etc. In some embodiments, the one or more servers 106 may receive the consumer device location data from consumer devices 108 via network 112.

At 616, the one or more servers 106 may be configured to determine one or more local merchant locations proximate to the consumer device location. The determination of local merchant locations may, at least in part, include comparing the consumer device location with the plurality of merchant locations. The one or more local merchant locations proximate to the consumer device location may include a subset of the merchant device locations that are associated with merchant devices at 604.

In some embodiments, the local merchant locations that are "proximate" to the consumer device location may include merchant locations that satisfy a distance threshold with respect to the consumer device location. The distance threshold may include default or predefined proximities (e.g., 1 mile, 3 miles, 5 miles, etc.) and/or may include user defined proximities, such as may be determined based on received consumer device inputs to the consumer interface.

As discussed above, the consumer device location may be determined based on the consumer device location data received at 614 and the merchant locations may be determined as discussed at 606. The distance threshold may be a predetermined distance (e.g., 1 mile, 5 miles, etc.) which may be set by consumer device inputs to the consumer interface as discussed below, or may be otherwise determined by server 106 and/or consumer device 108. In some embodiments, the distance threshold may be determined based on determining the travel speed of the consumer device. For example, server 106 may poll the consumer device over time to determine consumer device locations, and based on the locations and the associated times, may be configured to determine the travel speed. For example, the travel speed may be determined based on determining changes in location for a predetermined period of time, and then determining the travel speed based on the total change in distance divided by the total time in which the consumer traveled the distance. A travel speed of around 3 miles per hour, for example, may indicate that the consumer is walking while carrying the consumer device. As such, the distance threshold may be set to a value (e.g., less than 1 mile) such that the walking consumer is only presented with local merchant locations within a walking distance. In another example, the distance threshold may be set to a greater value (e.g., less than 3 miles) for a travel speed of around 15 miles per hour, which may indicate that the consumer is riding a bike. In yet another example, the distance threshold may be set to an even greater value (e.g., less than 10 miles) for a travel speed of greater than 30 miles per hour, which may indicate that the consumer is riding in an automobile. Advantageously, the determination of the travel speed provides for improved accuracy in programmatic determinations of location-based relevance than simply using a (e.g., current) location. Furthermore, when the travel speed is based on real-time consumer device location polling, the system is able to automatically account for changes in travel speed (e.g., without requiring and consumer device user inputs), and may adjust the distance threshold in real-time accordingly. For example, the system may determine that a commuting consumer rides bike to a bus station, then rides a bus to a train station, then takes a bus to the destination, and may provide indications of relevant merchants along the travel path of the consumer that the consumer likely would be able or willing to reach using the current mode of transportation and/or travel speed.

In some embodiments, the distance threshold may be set based on consumer device input. For example, the consumer device input may indicate the mode of transportation for the consumer. The consumer may indicate via the consumer interface that the consumer is walking, riding a bike, riding in an automobile, etc. or has access to such modes of transportation. In another example, the distance threshold may be set based on consumer device inputs that manipulate an ambient map display of a consumer interface as discussed in further detail below.

In some embodiments, the one or more local merchants may be determined from the plurality of candidate merchants based factors in addition or alternative to location, such as merchant category and/or relevance to the consumer. A merchant category may define the type of product or service offered by the merchant, such as restaurant, retail shop, spa, etc. In some embodiments, the one or more servers 106 may receive consumer device inputs generated via the consumer interface indicating a selected merchant category and may determine the one or more local merchants based on a comparison of the consumer device inputs with merchant data (e.g., stored in database 106). In some embodiments, the one or more servers 106 may programmatically determine merchant category and/or relevance, such as based on processing electronic marketing information associated with consumer devices and/or merchant devices as discussed above. In that sense, the merchants shown within an ambient map display may be responsive to the status of the consumer in terms of location, time, preferences, etc.

At 618, the one or more servers 106 may be configured to generate a consumer interface including an ambient map display. As discussed in greater detail below in connection with FIGS. 7-11, ambient map display may include one or more local merchant indicators associated with the one or more local merchants. Furthermore, at least one of the one or more local merchant locations indicators may be visually enhanced based the activity level score (and/or some other indicator of consumer activity at the merchant location) for the one or more local merchant location. For example, the ambient map display may include a graphical representation of a map with the one or more local merchant location indicators within the map that indicate the activity level scores.

At 620, the one or more servers 106 may be configured to provide, via the network, the consumer interface to the consumer device. The consumer device may be a thin client device that receives display outputs and provides consumer device inputs to the one or more servers for interaction with the consumer interface. In some embodiments, the consumer device may be configured to generate the consumer interface. Here, the one or more servers may provide input data such as transaction data, merchant data, merchant location data, activity level scores, etc. to the consumer device and the consumer device may generate the consumer interface as discussed herein for the one or more servers. FIGS. 7-11 show example electronic displays that may be provided to the consumer interface on the consumer device. FIG. 7 shows an example home display 700 of the consumer device in accordance with some embodiments. Home display 700 may be provided by the mobile operating system of the consumer device and may include one or more electronic buttons representing different communication channels through which the consumer interface may be accessed on the consumer device. As such, home display 700 may include mobile application button 702, mobile browser button 704, email button 706, and/or text message button 708. In response to consumer device inputs (e.g., touch-screen inputs) indicating the selection of one or more buttons 702-708, server 106 may be configured to provide the ambient map display to the consumer interface.

FIG. 8 shows an example of an ambient map display 800 in accordance with some embodiments. Ambient may display 800 may include a map 802 and one or more local merchant location indicators 804 within map 802. FIG. 9 shows another example of an ambient map display 900 in accordance with some embodiments. Ambient may display 900 may include a map 902 and one or more local merchant location indicators 904 within map 902. With reference to FIGS. 8 and 9, the local merchant location indicators 804 and 904 may be represented with an icon, such as the location markers shown in ambient map display 800 or the dots shown in ambient map display 900. In some embodiments, the size and/or shape of the local merchant location indicators may be adjusted based on the number of merchants displayed within the map, the zoom level (e.g., and/or distance threshold) of the map, among other things to provide enhanced clarity of the presentation.

As discussed above, an ambient map display may further provide an indication of the activity level score for each of the one or more local merchant locations. For example, at least one of the local merchant indicators (or "merchant indicators") within an ambient map display may be visually enhanced based on the activity level score. In some embodiments, the activity level score may be represented by a blink rate for the local merchant location indicators. For example, a higher activity level score may be associated with a faster blink rate while a lower activity level score may be associated with a slower blink rate. Additionally or alternatively, other visual indictors may be used such as the size or color of the local merchant location indicator. For example, a higher activity level score may be associated with a larger size, or a brighter/higher energy color.

As used herein, a "visually enhanced" merchant indicator refers to presenting, emphasizing, altering, or enhancing one or more features of the merchant location indicator, via an interface (e.g., the consumer interface), in order to convey information associated with a merchant represented by the merchant location indicator. A visually enhanced merchant indicator may change or modify a common feature shared by one or more merchant indicators. For example, a visually enhanced merchant indicator may be used to indicate a relationship between two or more merchant indicators, such as a relative activity level score between the merchants represented by the two or more merchant indicators. In another embodiment, a visually enhanced merchant indicator may identify a suggested merchant indicator as distinct from one or more merchant indicators. A visually enhanced merchant indicator may also be used to convey objective information about a merchant represented by the merchant indicator, such as promotion or item data. In some embodiments, the visually enhanced merchant indicator may be presented as a visual indication, and/or in combination with an audio (e.g., beep) indication or tactile (e.g., vibration) indication.

In some embodiments, a local merchant location indicator may be configured to blink for each instance of transaction data received by server 106 from merchant devices associated with the merchant location. Here, the local merchant location indicator blink rate (or other visual indicator) may indicate the frequency of transactions using transaction data generated through real-time consumer activity at the merchant location (e.g., without any averaging or estimating over time).

In some embodiments, the one or more servers 106 may be further configured to provide a consumer device location indicator to the ambient map display. For example, ambient map display 900 may include consumer device location indicator 906 within the map 902. Here, the consumer interface may provide an indication of the consumer location relative to the one or more displayed merchant locations. In some embodiments, the consumer device location indicator 906 may be centered on the map 902 as displayed in the ambient map display 900 and may be updated in real-time based on polling consumer device location changes.

Advantageously, the visually enhanced merchant indicators of the ambient map display provides an interface particularly adapted for mobile consumer devices. Mobile consumer devices, such as smartphones, navigation devices, or wearables, often include design constraints as dictated by the need for mobility. Some design constraints include single displays with small screen size, as well as the types of user input devices that are available (e.g., touch screen). Here, the ambient map display and merchant indicators may be integrated with a navigation interface to reduce the need for simultaneous multiple application control and interfacing. For example, the control of multiple applications on conventional mobile devices (e.g., separate navigation and consume interfaces) is particularly cumbersome, often requiring the use of a home button, or the like, to exit a current application and enter a mobile operating system desktop display with application icons, and then selection of a particular application icon to bring a second application to the foreground. The ambient map display may provide for the reduction of consumer inputs required to perform complex interactions on a mobile device while executing a navigation process, which may be particularly advantageous in the context of a traveling or otherwise multi-tasking consumer. Furthermore, additional interface efficiencies may be achieved because travel path rerouting based on a selected merchant indicator may be provided to the ambient map display as discussed in greater detail below.

At 622, the one or more servers 106 may be configured to determine whether to consumer selected a merchant location indicator within the ambient map display. For example, the local merchant location indicators 804 and 904 within ambient map displays 800 and 900 respectively may each be electronic buttons that provide references or links to additional merchant information. In some embodiments, consumer selection of a merchant location indicator may be provided via consumer device inputs to a touchscreen of the consumer device. However, one or more other types of consumer inputs may also be used such as keyboard inputs, voice inputs, mouse inputs, etc.

In response to determining that the consumer has selected a merchant location indicator, method 600 may proceed to 622, where the one or more servers 106 may be configured to provide a merchant display to the consumer interface. FIG. 10 shows an example of a merchant display 1000 in accordance with some embodiments. For example, in response to the consumer selecting local merchant indicator 1004 within map 1002, server 106 may be configured to provide the merchant display 1000 including merchant data overlay 1002. Merchant data overlay 1002 may include directions button 1006, call button 1008, and merchant data 1010. Call button 1008 may be associated with the telephone number of the merchant location, and selection of the call button 1008 may result in the initiation of a telephone dialing process on the consumer device to the associated telephone number. Directions button 1006, when selected, may result in server 106 providing a directions display to the consumer interface.

FIG. 11 shows an example of a directions display 1100 in accordance with some embodiments. Directions display 1100 may be configured to provide an indication an optimal or recommended path 1106 from the consumer device location 1102 to the selected merchant location 1104 within a map. Direction display 1100 may further include distance indicator 1108, indicating the distance from consumer device location 1102 to the selected merchant location 1104 along path 1106, and arrival time indicator 1110 indicating an estimated travel time from consumer device location 1102 to the selected merchant location 1104 along path 1106. In some embodiments, the path 1106, distance, and estimated travel time may be determined based on the travel speed and/or mode of transportation of the consumer. For example, the path for a consumer traveling by foot may include sidewalks or walkways that are otherwise inaccessible by an automobile.

Returning to 622, in response to determining that the consumer has not selected a merchant location indicator within the ambient map display, method 600 may return to 614, where the one or more servers may be configured to continue to receive, via the network and from the consumer device, consumer device location data indicating a consumer device location of the consumer device. Here, server 106 may be configured to poll the consumer device for the consumer device location, such as at predetermined times. In another example, the consumer device may be configured to push the consumer device location to the server 106. Server 106 may use the updated consumer device locations to generate and/or update the consumer interface at 616-622 as discussed above. Method 600 may then proceed to 624 and end.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A system comprising at least one processor and at least one memory having computer-coded instructions stored thereon, the computer-coded instructions in execution with the at least one processor configured to:

determine, in real-time, an activity level score for each of a plurality of merchant locations, the activity level score for a merchant location of the plurality of merchant locations based on transaction data for the merchant location;
determine, based at least in part on the transaction data and the merchant location, one or more relevant merchant locations, each relevant merchant location of the one or more relevant merchant locations associated with promotion data relevant to a consumer account associated with a consumer device, and wherein the one or more relevant merchants locations is further determined based on past consumer purchases for the consumer account associated with the consumer device;
cause rendering, to the consumer device, of a consumer interface including an ambient map display, wherein the ambient map display comprises a merchant location indicator set associated with at least one of the one or more relevant merchant locations, and wherein at least one merchant location indicator of the merchant location indicator set is visually enhanced based on the activity level score corresponding to the at least one of the one or more relevant merchant locations.

2. The system of claim 1, further configured to:
determine, based on electronic marketing information collected from a plurality of consumer devices comprising the consumer device and at least one of a plurality of merchant devices, a relevant merchant set associated with a relevant merchant location set of the plurality of merchant locations,
wherein the one or more relevant merchant locations comprises one or more of the relevant merchant location set.

3. The system of claim 1, wherein the transaction data comprises previous transaction data.

4. The system of claim 1, wherein the transaction data comprises at least one data selected from the group comprising consumer payment information, consumer billing information, consumer approval data, consumer shipping information, items purchased information, merchant rewards account data, and shipping type selection data.

5. The system of claim 1, wherein the activity level score for each merchant location is determined based on a value of transactions associated with the merchant location based on the transaction data for the merchant location or a number of transactions associated with the merchant location based on the transaction data for the merchant location.

6. A method, comprising:
determining, in real-time, an activity level score for each of a plurality of merchant locations, the activity level score for a merchant location of the plurality of merchant locations based on transaction data for the merchant location;
determining, based at least in part on the transaction data and the merchant location, one or more relevant merchant locations, each relevant merchant location of the one or more relevant merchant locations is associated with promotion data relevant to a consumer account associated with a consumer device, and wherein the one or more relevant merchant locations is further determined based on past consumer purchases for the consumer account associated with the consumer device;
causing rendering, to the consumer device, of a consumer interface including an ambient map display, wherein the ambient map display comprises a merchant location indicator set associated with at least one of the one or more relevant merchant locations, and wherein at least one merchant location indicator of the merchant location indicator set is visually enhanced based on the activity level score corresponding to the at least one of the one or more relevant merchant locations.

7. The method of claim 6, further comprising:
determining, based on electronic marketing information collected from a plurality of consumer devices comprising the consumer device and at least one of a plurality of merchant devices, a relevant merchant set associated with a relevant merchant location set of the plurality of merchant locations,
wherein the one or more relevant merchant locations comprises one or more of the relevant merchant location set.

8. The method of claim 6, wherein the transaction data comprises previous transaction data.

9. The method of claim 6, wherein the transaction data comprises at least one data selected from the group comprising consumer payment information, consumer billing information, consumer approval data, consumer shipping information, items purchased information, merchant rewards account data, and shipping type selection data.

10. The method of claim 6, wherein the activity level score for each merchant location is determined based on a value of transactions associated with the merchant location based on the transaction data for the merchant location or a number of transactions associated with the merchant location based on the transaction data for the merchant location.

11. A computer program product comprising at least one non-transitory computer-readable storage medium having computer program code thereon, the computer program code in execution with at least one processor configured for:
determining, in real-time, an activity level score for each of a plurality of merchant locations, the activity level score for a merchant location of the plurality of merchant locations based on transaction data for the merchant location;
determining, based at least in part on the transaction data and the merchant location, one or more relevant merchant locations, each relevant merchant location of the one or more relevant merchant locations associated with promotion data relevant to a consumer account associated with a consumer device, and wherein the one or more relevant merchant locations is further determined based on past consumer purchases for the consumer account associated with the consumer device;
causing rendering, to the consumer device, of a consumer interface including an ambient map display, wherein the ambient map display comprises a merchant location indicator set associated with at least one of the one or more relevant merchant locations, and wherein at least one merchant location indicator of the merchant location indicator set is visually enhanced based on the activity level score corresponding to the at least one of the one or more relevant merchant locations.

12. The computer program product of claim 11, further configured for:
determining, based on electronic marketing information collected from a plurality of consumer devices comprising the consumer device and at least one of a plurality of merchant devices, a relevant merchant set associated with a relevant merchant location set of the plurality of merchant locations,
wherein the one or more proximate merchant locations comprises one or more of the relevant merchant location set.

13. The computer program product of claim 11, wherein the transaction data comprises previous transaction data.

14. The computer program product of claim 11, wherein the transaction data comprises at least one data selected from the group comprising consumer payment information, consumer billing information, consumer approval data, consumer shipping information, items purchased information, merchant rewards account data, and shipping type selection data.

15. The system of claim 1, wherein the at least one merchant location indicator is visually adjusted based on a number of merchant location indicators in the merchant location indicator set.

16. The method of claim 6, wherein the at least one merchant location indicator is visually adjusted based on a number of merchant location indicators in the merchant location indicator set.

17. The computer program product of claim 11, wherein the at least one merchant location indicator is visually adjusted based on a number of merchant location indicators in the merchant location indicator set.

18. The system of claim 1, further configured to:
associate a plurality of merchant devices with the plurality of merchant locations, one or more of the plurality of merchant devices associated with the merchant location processes the transaction data.

19. The method of claim 6, further comprising:
associating a plurality of merchant devices with the plurality of merchant locations, one or more of the plurality of merchant devices associated with the merchant location processes the transaction data.

20. The computer program product of claim 11, further configured for:
associating a plurality of merchant devices with the plurality of merchant locations, one or more of the plurality of merchant devices associated with the merchant location processes the transaction data.

* * * * *

UNITED STATES PATENT AND TRADEMARK OFFICE
CERTIFICATE OF CORRECTION

| | | |
|---|---|---|
| PATENT NO. | : 10,972,867 B2 | Page 1 of 1 |
| APPLICATION NO. | : 16/990401 | |
| DATED | : April 6, 2021 | |
| INVENTOR(S) | : Chicoine et al. | |

It is certified that error appears in the above-identified patent and that said Letters Patent is hereby corrected as shown below:

In the Claims

<u>Column 34,</u>
Line 65, Claim 12 "proximate" should read --relevant--.

Signed and Sealed this
Twenty-seventh Day of September, 2022

Katherine Kelly Vidal
*Director of the United States Patent and Trademark Office*